(12) United States Patent
Liu et al.

(10) Patent No.: US 12,707,384 B2
(45) Date of Patent: Aug. 11, 2026

(54) METHOD AND APPARATUS FOR SELECTING RESOURCE, METHOD AND APPARATUS FOR PROCESSING POWER SAVING, AND DEVICE

(71) Applicant: VIVO MOBILE COMMUNICATION CO., LTD., Guangdong (CN)

(72) Inventors: Siqi Liu, Guangdong (CN); Zichao Ji, Guangdong (CN); Yu Zeng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 358 days.

(21) Appl. No.: 18/350,991

(22) Filed: Jul. 12, 2023

(65) Prior Publication Data

US 2023/0354185 A1 Nov. 2, 2023

Related U.S. Application Data

(63) Continuation of application No. PCT/CN2022/070979, filed on Jan. 10, 2022.

(30) Foreign Application Priority Data

Jan. 15, 2021 (CN) ......................... 202110057836.5

(51) Int. Cl.
*H04W 52/02* (2009.01)
*H04L 1/1812* (2023.01)
(Continued)

(52) U.S. Cl.
CPC ... *H04W 52/0203* (2013.01); *H04W 52/0212* (2013.01)

(58) Field of Classification Search
CPC ......... H04W 52/0203; H04W 52/0212; H04W 72/02; H04W 72/25; H04W 52/0229;
(Continued)

(56) References Cited

U.S. PATENT DOCUMENTS

2018/0302768 A1 10/2018 Uchiyama
2019/0069240 A1* 2/2019 Jiang ................ H04W 52/0235
(Continued)

FOREIGN PATENT DOCUMENTS

CN 109429315 A 3/2019
CN 110574443 A 12/2019
(Continued)

OTHER PUBLICATIONS

OPPO, "Power saving mechanisms in NR sidelink", 3GPP TSG RAN WG1 #103-e, R1-2008239, e-Meeting, Oct. 26-Nov. 13, 2020.
(Continued)

*Primary Examiner* — Harry H Kim
(74) *Attorney, Agent, or Firm* — Price Heneveld LLP

(57) ABSTRACT

This application discloses a method and apparatus for selecting a resource, a method and apparatus for processing power saving, and a device, and relates to the technical field of communication. The method includes: obtaining a target resource associated with power-saving information; and determining a first resource in the target resource; the first resource comprising at least one of the following: a resource of the power-saving information, a resource of target transmission, and an idle resource.

16 Claims, 9 Drawing Sheets

(51) Int. Cl.

| | |
|---|---|
| ***H04W 72/02*** | (2009.01) |
| ***H04W 72/0446*** | (2023.01) |
| ***H04W 72/0453*** | (2023.01) |
| ***H04W 72/0457*** | (2023.01) |
| ***H04W 72/1263*** | (2023.01) |
| ***H04W 72/25*** | (2023.01) |
| ***H04W 72/51*** | (2023.01) |
| ***H04W 72/53*** | (2023.01) |
| ***H04W 92/18*** | (2009.01) |

(58) Field of Classification Search

CPC ......... H04W 52/0209; H04W 52/0225; H04W 72/53; H04W 72/0446; H04W 72/0453; H04W 72/0457; H04W 72/1263; H04W 72/51; H04W 92/18; Y02D 30/70; H04L 1/1812

See application file for complete search history.

(56) References Cited

U.S. PATENT DOCUMENTS

| | | | | |
|---|---|---|---|---|
| 2022/0256464 | A1 | 8/2022 | Zhao | |
| 2022/0394614 | A1* | 12/2022 | Hwang | H04L 1/1822 |
| 2022/0408363 | A1* | 12/2022 | Lu | H04W 4/40 |
| 2023/0247557 | A1 | 8/2023 | Zhao | |
| 2025/0267738 | A1* | 8/2025 | Mochizuki | H04W 72/25 |

FOREIGN PATENT DOCUMENTS

| | | | |
|---|---|---|---|
| CN | 110972237 | A | 4/2020 |
| CN | 111417208 | A | 7/2020 |
| CN | 111770562 | A | 10/2020 |
| JP | 2017139658 | A | 8/2017 |
| WO | 2020131932 | A2 | 6/2020 |
| WO | 2020218892 | A1 | 10/2020 |
| WO | 2022068611 | A1 | 4/2022 |

OTHER PUBLICATIONS

Fraunhofer IIS, Fraunhofer HHI, “NR Sidelink Resource Allocation for UE Power Saving”, 3GPP TSG RAN WG1 Meeting #103-e, R1-2008817, e-Meeting, Oct. 26-Nov. 13, 2020.

Intel Corporation, “Sidelink enhancements for UE power saving”, 3GPP TSG RAN WG1 Meeting #103-E, R1-2008998, e-Meeting, Oct. 26-Nov. 13, 2020.

Huawei, Hisilicon, “Consideration on the sidelink DRX for unicast, groupcast and broadcast”, 3GPP TSG-RAN WG2 Meeting #112 electronic, R2-2009413, Nov. 2-13, 2020.

* cited by examiner

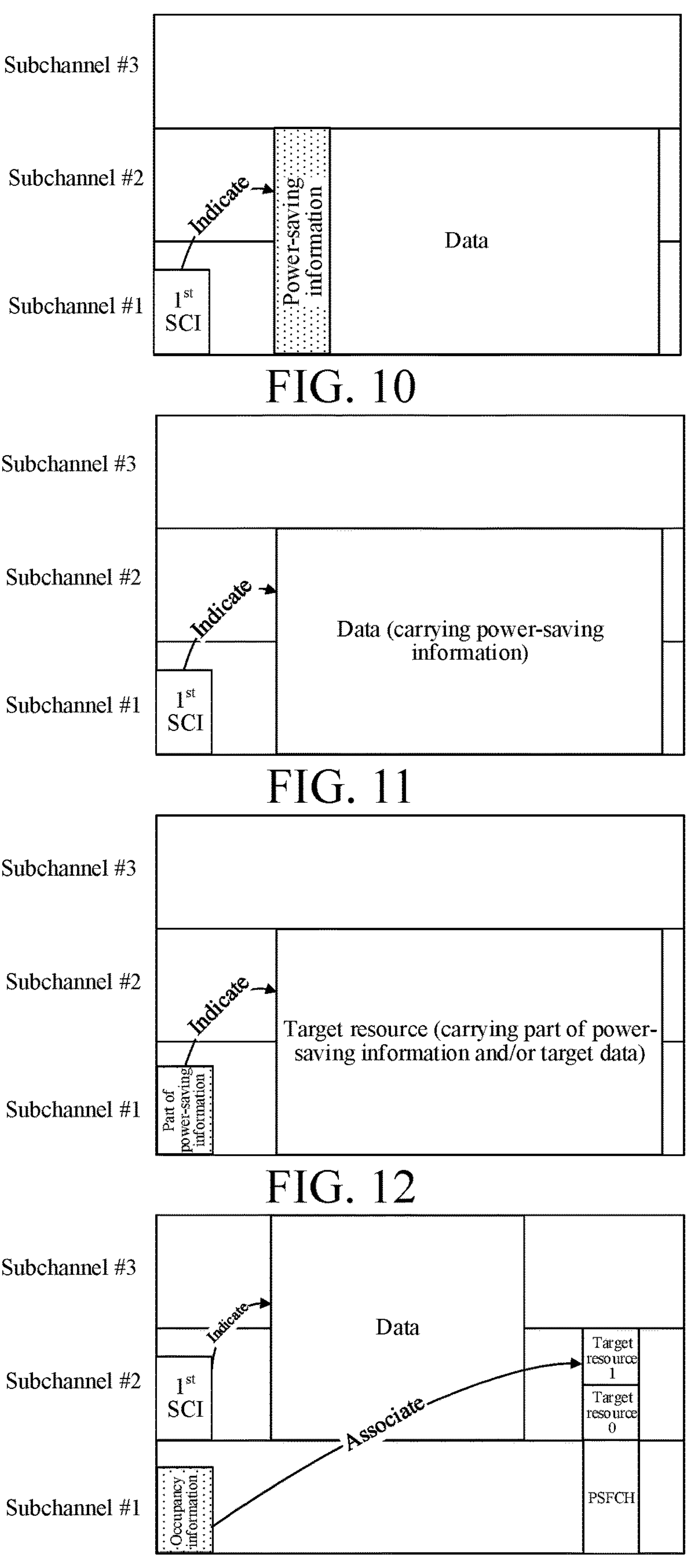
Subchannel #3
Subchannel #2
Subchannel #1
Indicate
1st SCI
Power-saving information
Data
FIG. 10
Subchannel #3
Subchannel #2
Subchannel #1
Indicate
1st SCI
Data (carrying power-saving information)
FIG. 11
Subchannel #3
Subchannel #2
Subchannel #1
Indicate
Part of power-saving information
Target resource (carrying part of power-saving information and/or target data)
FIG. 12
Subchannel #3
Subchannel #2
Subchannel #1
Indicate
1st SCI
Data
Associate
Occupancy information
Target resource 1
Target resource 0
PSFCH
FIG. 13

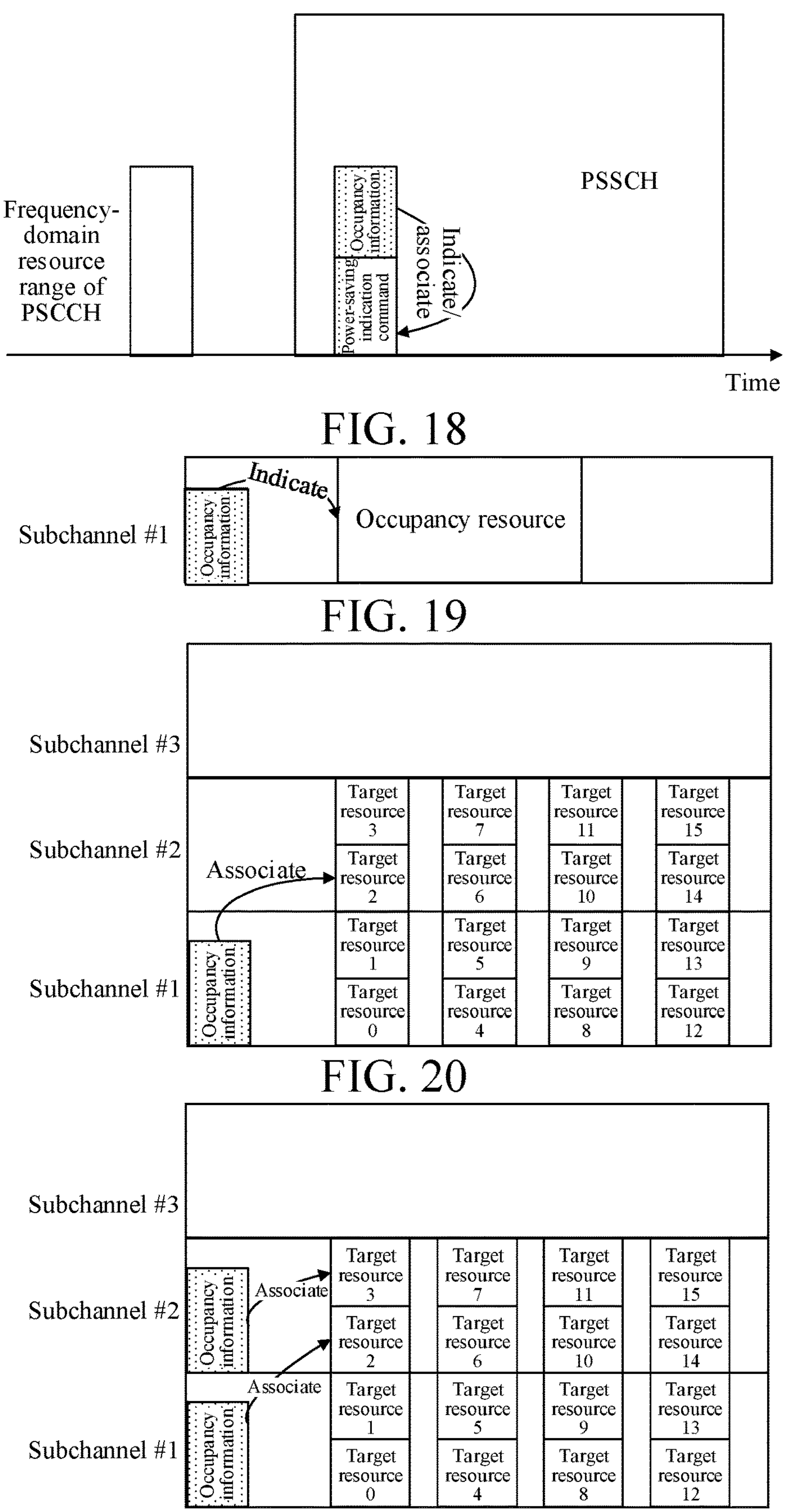
Frequency-domain resource range of PSCCH
PSSCH
Occupancy information
Power-saving indication command
Indicate/associate
Time
FIG. 18
Subchannel #1
Occupancy information
Indicate
Occupancy resource
FIG. 19
Subchannel #3
Subchannel #2
Subchannel #1
Associate
Occupancy information
Target resource 0
Target resource 1
Target resource 2
Target resource 3
Target resource 4
Target resource 5
Target resource 6
Target resource 7
Target resource 8
Target resource 9
Target resource 10
Target resource 11
Target resource 12
Target resource 13
Target resource 14
Target resource 15
FIG. 20
Subchannel #3
Subchannel #2
Subchannel #1
Occupancy information
Occupancy information
Associate
Associate
Target resource 0
Target resource 1
Target resource 2
Target resource 3
Target resource 4
Target resource 5
Target resource 6
Target resource 7
Target resource 8
Target resource 9
Target resource 10
Target resource 11
Target resource 12
Target resource 13
Target resource 14
Target resource 15
FIG. 21

METHOD AND APPARATUS FOR SELECTING RESOURCE, METHOD AND APPARATUS FOR PROCESSING POWER SAVING, AND DEVICE

CROSS-REFERENCE TO RELATED APPLICATIONS

The present application is a continuation application of International Application No. PCT/CN2022/070979 filed on Jan. 10, 2022, which claims priority of Chinese Patent Application No. 202110057836.5 filed in China on Jan. 15, 2021, both of which are incorporated herein by reference in their entireties.

TECHNICAL FIELD

This application belongs to the technical field of communications, and particularly relates to a method and apparatus for selecting a resource, a method and apparatus for processing power saving, and a device.

BACKGROUND

Currently, some low-capacity user equipment, such as cell phones, home devices, etc., may require a side link (SL) for direct or indirect communication between them. These devices have low battery capacity and thus cannot be used for a long time and the volume of data for some services between the devices may be low, thereby causing a long cycle.

However, in existing SL transmissions, the device has to remain active during on duration for receiving and/or transmitting. However, during on duration, the device may have no packets to transmit or may not be able to receive scheduling signaling, in which case forcing the user equipment to wake up during on duration can lead to unnecessary power consumption. Also, since SL communication can be multicast, the user equipment transmitting information can cause conflicts.

SUMMARY

Embodiments of this application aim to provide a method and apparatus for selecting a resource, a method and apparatus for processing power saving, and a device, which can solve the problem of information resource conflict in the unnecessary power-consumption processing process.

To solve the foregoing technical problems, this application is implemented as follows.

According to a first aspect, an embodiment of this application provides a method for selecting a resource, executed by first user equipment, including:

obtaining a target resource associated with power-saving information; and determining a first resource in the target resource; the first resource including at least one of the following:

a resource of the power-saving information, a resource of target transmission, and an idle resource.

According to a second aspect, an embodiment of this application provides a method for processing power saving, executed by second user equipment, including:

receiving power-saving information, the power-saving information being associated with a target resource, the target resource being used for determining a first resource;

the first resource including at least one of the following:

a resource of the power-saving information, a resource of target transmission, and an idle resource.

According to a third aspect, an embodiment of this application provides an apparatus for selecting a resource, including:

an obtaining module, configured to obtain a target resource associated with power-saving information; and a determining module, configured to determine a first resource in the target resource; the first resource including at least one of the following:

a resource of the power-saving information, a resource of target transmission, and an idle resource.

According to a fourth aspect, an embodiment of this application provides an apparatus for processing power saving, including:

a receiving module, configured to receive power-saving information, the power-saving information being associated with a target resource, the target resource being used for determining a first resource; the first resource including at least one of the following:

a resource of the power-saving information, a resource of target transmission, and an idle resource.

According to a fifth aspect, an embodiment of this application provides an electronic device, the electronic device including a processor, a memory, and a program or instruction stored on the memory and executable on the processor, the program or instruction, when executed by the processor, implementing steps of the method according to the first aspect or the method according to the second aspect.

According to a sixth aspect, an embodiment of this application further provides a readable storage medium, a program or instruction being stored on the readable storage medium, the program or instruction, when executed by a processor, implementing steps of the method according to the first aspect or the method according to the second aspect.

According to a seventh aspect, an embodiment of this application provides a chip, the chip including a processor and a communication interface, the communication interface being coupled to the processor, and the processor being configured to run programs or instructions to implement the method according to the first aspect or the method according to the second aspect.

According to an eighth aspect, an embodiment of this application provides computer program product, the computer program product being stored in a non-volatile storage medium, the computer program product being executed by at least one processor to implement steps of the method according to the first aspect or the method according to the second aspect.

Thus, in the embodiments of this application, in the obtained target resource associated with the power-saving information, the applicable first resource is further determined, such that the user equipment at both ends of communication keep consistent understanding on resources, thereby achieving coordination and saving power.

BRIEF DESCRIPTION OF THE DRAWINGS

FIG. 6 is a schematic application diagram VI of the method for selecting a resource according to the embodiment of this application;

FIG. 7 is a schematic application diagram V of the method for selecting a resource according to the embodiment of this application;

FIG. 8 is a schematic application diagram VI of the method for selecting a resource according to the embodiment of this application;

FIG. 10 is a schematic application diagram VIII of the method for selecting a resource according to the embodiment of this application;

FIG. 11 is a schematic application diagram IX of the method for selecting a resource according to the embodiment of this application;

FIG. 12 is a schematic application diagram X of the method for selecting a resource according to the embodiment of this application;

FIG. 13 is a schematic application diagram XI of the method for selecting a resource according to the embodiment of this application;

FIG. 18 is a schematic application diagram XVI of the method for selecting a resource according to the embodiment of this application;

FIG. 19 is a schematic application diagram XVII of the method for selecting a resource according to the embodiment of this application;

FIG. 20 is a schematic application diagram XVIII of the method for selecting a resource according to the embodiment of this application;

FIG. 21 is a schematic application diagram XIX of the method for selecting a resource according to the embodiment of this application;

DETAILED DESCRIPTION

The technical solutions in embodiments of this application are clearly and completely described in the following with reference to the accompanying drawings in the embodiments of this application. Apparently, the described embodiments are some rather than all of the embodiments of this application. All other embodiments obtained by a person of ordinary skill in the art based on the embodiments of this application without making creative efforts shall fall within the protection scope of this application.

In the specification and claims of this application, terms "first" and "second" are used to distinguish similar objects, but are not used to describe a specific sequence or order. It is to be understood that such used data is interchangeable where appropriate so that the embodiments of this application can be implemented in an order other than those illustrated or described here. In addition, "and/or" in the specification and the claims represents at least one of the connected objects. Except use in "and/or", the character "/" generally indicates an "and/or" relationship between the associated objects. "( )" indicates that in addition to the explanatory description, an optional feature can also be indicated, and transmission is interpreted as receiving or transmitting. In addition, the ratio of A to B in this application, can be A÷B, or B÷A. If A÷B is claimed, B÷A corresponding thereto can also be considered claimed.

It is to be noted that the technologies described in the embodiments of this application are not limited to a long-term evolution (LTE)/LTE-advanced (LTE-A) system, and may further be applied to other wireless communication systems such as code division multiple access (CDMA), time division multiple access (TDMA), frequency division multiple access (FDMA), orthogonal frequency division multiple access (OFDMA), single carrier frequency-division multiple access (SC-FDMA), and other systems. The terms "system" and "network" are often used interchangeably in the embodiments of this application, and the technologies described may be used for both the systems and radio technologies mentioned above, as well as for other systems and radio technologies. However, the following description describes a new radio (NR) system for exemplary purposes and uses the term NR for much of the following description, although these technologies may also be used in applications other than applications of the NR system, such as 6th generation (6G) communication systems.

Figure 1:
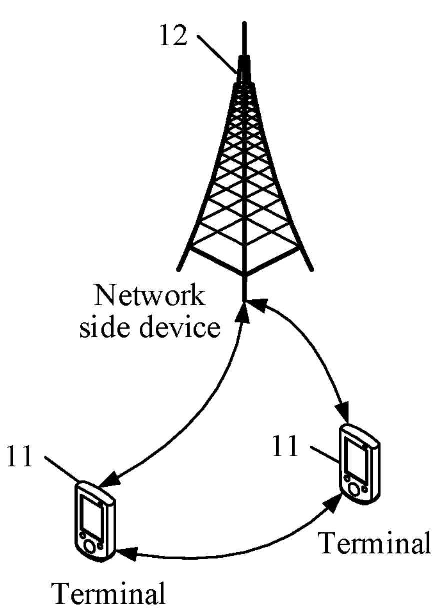
FIG. 1 is a block diagram of a wireless communication system.

FIG. 1 is a block diagram of a wireless communication system which embodiments of this application can apply. The wireless communication system includes terminals 11 and a network side device 12. The terminal 11 may also be called a terminal device or user equipment (UE), the terminal 11 may be a mobile phone, a tablet personal computer (TPC), a laptop computer (LC) or a notebook computer, a personal digital assistant (PDA), a palmtop, a netbook, an ultra-mobile personal computer (UMPC), a mobile Internet device (MID), a wearable device, or vehicle user equipment (VUE), pedestrian user equipment (PUE), and other terminal side devices, and the wearable device includes: wristbands, headphones, glasses, etc. It is to be noted that: the specific type of the terminal 11 is not limited in the embodiments of this application, the network side device 12 may be a base station or a core network, where the base station may be referred to as a node B, an evolved node B, an access point, a base transceiver station (BTS), a radio base station, a radio transceiver, a basic service set (BSS), an extended service set (ESS), a node B, an evolved node B (eNB), a household node B, a household evolved node B, a wireless local area network (WLAN) access point, a wireless fidelity (WiFi) node, a transmitting receiving point (TRP) or some other suitable terms in the field as long as the same technical effect is achieved, the base station is not limited to a specific technical word, it is to be noted that only a base station in the NR system is used as an example in the embodiments of this application, but the specific type of the base station is not limited.

The method for selecting a resource provided by the embodiment of this application is described in detail below by means of a specific embodiment and the application scenarios thereof in conjunction with the attached drawings.

The method of the embodiment of this application is applied to user equipment, and the user equipment may refer to an access terminal, a user unit, a user station, a mobile station, a mobile workbench, a remote station, a remote terminal, a mobile device, a user terminal, a terminal, a wireless communication device, a user agent, or a user device. The terminal device may also be a cellular telephone, a cordless telephone, a session initiation protocol (SIP) telephone, a wireless local loop (WLL) station, PDA, a handheld device with a wireless communication function, a computing device or other processing devices connected to a wireless modem, vehicle user equipment, and a wearable device.

Figure 2:
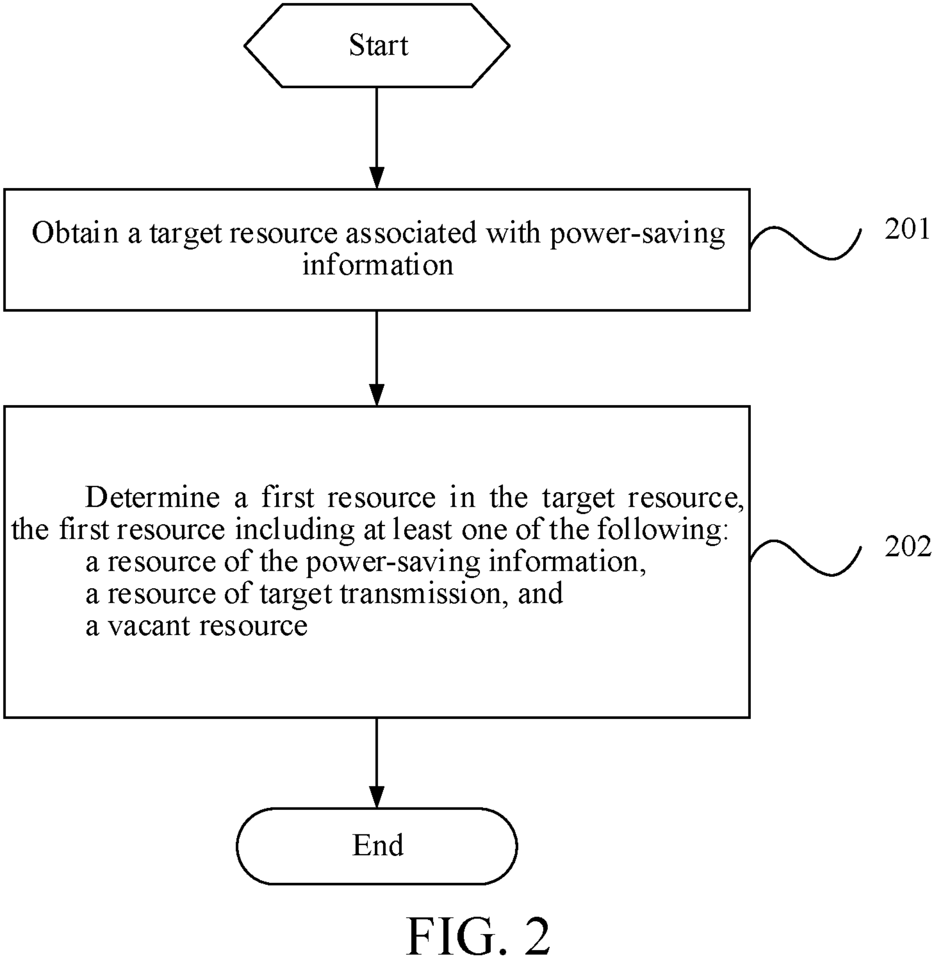
FIG. 2 is a schematic flowchart of a method for selecting a resource according to an embodiment of this application.

As shown in FIG. 2, a method for selecting a resource of an embodiment of this application is executed by first user equipment and includes:

Step 201: Obtain a target resource associated with power-saving information.

Here, the power-saving information is used for indicating that first target user equipment is active or woken up or inactive or dormant. If the first user equipment is noted as UE1, second user equipment may be noted as UE2. UE2 is UE that communicates with UE1, UE that receives signals or channels from UE1, UE that transmits signals or channels to UE1, or, UE that establishes a connection or group with UE1. The first target user equipment may be UE1 or UE2, or other devices other than UE1 and UE2. The power-saving information has the target resource associated with it. In the step, the target resource associated with the power-saving information is obtained for subsequently determining resources corresponding to the first user equipment.

Step 202: Determine a first resource in the target resource; the first resource including at least one of the following:

a resource of the power-saving information, a resource of target transmission, and an idle resource.

In the step, the first resource is determined in the target resource obtained in step 201. Here, the first resource includes at least one of the following: a resource of the power-saving information, a resource of target transmission, and an idle resource. It is further understood that the first resource is of the type of at least one of the three resources described above, that is, the first resource is for the actual transmission of the power-saving information and/or the actual target transmission, and may also be used as an actual idle resource.

Thus, according to steps 201 and 202, in the obtained target resource associated with the power-saving information, the applicable first resource is further determined, the first resource may be used for at least one of the transmission of the power-saving information, the transmission of the target transmission, and vacancy, such that the user equipment at both ends of the communication keep consistent understanding on resources, thereby achieving coordination and saving power.

It is to be noted that: the dormancy or wake-up or inactivation or activation mentioned in the embodiment of this application includes:

1. Being related to a SL power-saving mechanism may be interpreted as dormancy or wake-up or inactivation or activation of the SL power-saving mechanism;
2. Being not related to the presence or absence of the SL power-saving mechanism, but distinguishing whether certain behaviors of the terminal can be performed normally, for example, in a case that the terminal is activated or woken up, the corresponding behavior can be performed; if the terminal is dormant or de-activated, the corresponding behavior cannot be performed.

In other words, activation or wake-up can be interpreted as the SL power-saving mechanism entering the activation time, or, performing activation or wake-up at the activation time or within the activation time of the SL power-saving mechanism can also mean that a certain behavior can be performed, for example, at least one of measuring, receiving data, receiving control, receiving synchronization signals, sensing, feedback, etc. can be performed.

De-activation or dormancy can be interpreted as the SL power-saving mechanism entering de-activation time, or, performing de-activation or dormancy at the activation time or within the activation time of the SL power-saving mechanism can also mean not performing a certain behavior, for example, at least one of measuring, receiving data, receiving control, receiving synchronization signals, sensing, feedback, etc. is not performed.

In this embodiment, the power-saving information includes at least one of the following:

occupancy information; and a power-saving indication command.

And, the power-saving information may be referred to as a wake up signal (WUS), such as SL WUS. That is, SL WUS includes occupancy information and/or a power-saving indication command. If the power-saving information includes only the power-saving indication command, the occupancy information can be understood as the associated information of the power-saving information, such as the occupancy information of SL WUS. If the power-saving information includes only the occupancy information, the power-saving indication command can be understood as the associated information of the power-saving information, such as the accompanying signaling of SL WUS.

It is to be noted that: in the embodiment of this application, the mentioned methods for obtaining information may be:

a) obtaining information according to at least one of protocol pre-definition, pre-configuration, base station configuration, other user equipment indication, other user equipment recommendation, other user equipment scheduling and other user equipment configuration;

b) after obtaining rules according to at least one of protocol pre-definition, pre-configuration, base station configuration, other user equipment indication, other user equipment recommendation, other user equipment scheduling and other user equipment configuration, further obtaining information based on the obtained rules.

The power-saving mechanism obtained by the user equipment specifically includes such as SL discontinuous reception (DRX) configuration and/or power-saving sensing configuration. The power-saving mechanism can be the power-saving mechanism of the user himself/herself, or power-saving mechanisms of other users; power-saving sensing can be partial sensing, or some simplified or shorter or non-periodic or triggered sensing.

SL DRX may be used for controlling at least one of sensing, measurement, monitoring and transmission of a target object by the user equipment, the target object including at least one of the following: control signals/channels, data signals/channels, reference signals, feedback signals/channels, requests, response messages, etc, for example, sidelink control information (SCI,containing at least one of $1^{st}$ stage SCI and $2^{nd}$ stage SCI), a physical sidelink shared channel (PSSCH), a physical sidelink control channel (PSCCH), a SL reference signal (RS), a physical sidelink feedback channel (PSFCH), a single synchronization signal block (S-SSB), channel state information (CSI), connection establishment response, etc.

SL DRX contains at least one of the following time (or may be called timers): on duration, off duration, a round trip time (RTT) timer, an inactivity timer, a retransmission timer, a long cycle and a short cycle.

SL DRX can be divided into activation time and/or inactivation time. During the activation time, the user equipment performs at least one of measurement, monitoring and transmission of the target object. At least one of the measurement, monitoring and transmission of the target object is not performed during the inactivation time. Other channels/signals except the target object may not be affected by DRX. Optionally, the activation time and the inactivation time may be defined for the target object, i.e. the activation time may be the same or different for different target objects, and the inactivation time may be the same or different for different target objects. For example, UE can perform transmission of a first target object during the activation time, and cannot perform transmission of a second target object during the inactivation time. The first target object and the second target object may be the same or different. Different target objects may correspond to different activation and inactivation time, where:

1) It is assumed that SCI can be transmitted at any time.
2) Receiving SCI is limited by the activation time of DRX, while transmitting SCI may be possible at the inactivation time, but is limited by a selection window.

The activation time and the inactivation time may be defined for the transmission direction, i.e. the activation time for transmitting and receiving may be the same or different, and the inactivation time for transmitting and receiving may be the same or different. Of course, the transmission direction of some target objects may have only the activation time without the inactivation time.

Power-saving sensing contains a sensing window and a selection window.

The activation time of SL DRX contains at least one of on duration, inactivity timer running time (in a case that an inactivity timer is running), Retransmission timer running time (in a case that a retransmission timer is running), T400 running time, and the period of a sidelink latency bound CSI-report (sl-LatencyBoundCSI-Report).

The inactivation time of SL DRX contains at least one of off duration and RTT timer running time.

The activation time of power-saving sensing contains at least one of a sensing window and a selection window.

The inactivation time of power-saving sensing contains at least one of a non-partial sensing window part (e.g., the part between or outside a partial sensing window), a non-selection window part (e.g., the part outside the selection window), and non-sensing time.

The measurable resource may be a (logical) resource at the (corresponding receiving or transmitting) activation time, preferably, at least the activation time for receiving the control channel and/or data channel, e.g. the activation time for receiving PSCCH and/or PSSCH.

An unmeasurable resource is a resource that may be at the inactivation time, preferably, at least the inactivation time for receiving the control channel and/or data channel, for example the inactivation time for receiving PSCCH and/or PSSCH.

The resources mentioned in this application contain time-domain and/or frequency-domain resources. The frequency-domain resource may be one or more subchannels/RB/interlace/comb (on one or more temporal time-domain resources). The time-domain resource may be one or more symbols/slots/mini-slots/milliseconds (ms)/subframes/frames/periodicity. The time-domain resource is either a physical time-domain resource or a logical time-domain resource, e.g. the slot can be either a physical slot or a logical slot. The time-frequency resource can be a single slot resource that occupies X subchannels or RB.

In this application, correspondence can also be interpreted as existence of the mapping relationship, existence of the association relationship, correlation, etc.

In this application, duration can be interpreted as the number of contained resources/measurable resources/logical resources.

The embodiment of this application is applicable to save power in SL scenarios in authorized bands and/or SL scenarios in unauthorized bands. This solution can be applied to scenarios where saving power is required at either end of UE at both the receiving and transmitting ends (e.g., a vehicle to pedestrian (V2P) network), or scenarios where saving power is required at both ends (e.g., a peer to peer (P2P) network, or PIOT, etc. to perform communicating via SL or other interfaces).

In the embodiment of this application, one UE may perform SL receiving or transmitting at different time points i.e., the UE is a transmitting end UR (TX UE) or a receiving end UE (RX UE), respectively.

The power-saving information is associated with the target resource in at least one of the following ways:

- a corresponding relationship exists between the power-saving information and at least part of the target resource;
- a corresponding relationship exists between the resource of the power-saving information and at least part of the target resource;
- both the power-saving information and the target transmission on at least part of the target resource are required to be transmitted;

The power-saving information indicates at least part of the target resource.

Here, both the power-saving information and the target transmission on at least part of the target resource are required to be transmitted, i.e., the power-saving information is transmitted together with the target transmission on at least part of the target resource. Specifically, it may be that the power-saving information and the target transmission are performed on the same resource (e.g., time-domain resource and/or frequency-domain resource); it may also be that the power-saving information and the target transmission are on different time-domain resources and/or frequency-domain resources, but both the power-saving information and the target transmission are required to be transmitted. The ratio of the number of the power-saving information to the number of the target transmission can be 1-to-many, many-to-1, or 1-to-1. And that the power-saving information and the target transmission are on the same time-domain resource and/or frequency-domain resource can also be interpreted as that the target transmission carries the power-saving information. Of course, regardless of whether the power-saving information and the target transmission are on the same resource, in a case that the power-saving information does not indicate/reserve the target resource for transmission together, further preferably, the target resource may be obtained by means of configuration/pre-configuration/protocol provisions, etc. For example, if the power-saving information is transmitted on resource 1 and the protocol specifies that resource 2 corresponds to resource 1, resource 2 is the target resource associated with the power-saving information.

For the power-saving information indicating at least part of the target resource, the power-saving information and the part of the target resource indicated by same may be in correspondence or transmitted together, or may not be in correspondence or transmitted together, which is not specifically listed here.

The type of the target resource includes at least one of the following:

a resource of occupancy information;

a resource of a power-saving indication command a resource of target transmission, and an idle resource.

That is, the use of the target resource includes at least one of the following: transmission of the occupancy information; transmission of the power-saving indication command; transmission of the target transmission; and vacancy. Of course, since the target resource may also be a candidate resource for at least one of the occupancy information, the power-saving indication command, and the target transmission, it is not necessarily used for the transmission of information. In addition, the type of the target resource may also include a resource of the power-saving information, i.e., the use of the target resource may also include the transmission of the power-saving information.

The occupancy information and the power-saving indication command may be occupancy information and a power-saving indication command in the current power-saving information, i.e., the current occupancy information and the current power-saving indication command; the occupancy information and the power-saving indication command may also be occupancy information and a power-saving indication command in other power-saving information, i.e., other occupancy information and other power-saving indication commands. The target transmission may be at least one of target data and target feedback. The target data may be interpreted as data transmission directed/reserved by the power-saving information (occupancy information and/or power-saving indication command), which may be any data content or a specific data content. The target feedback can be interpreted as feedback related to the power-saving information, specifically, either a hybrid automatic repeat request acknowledgement (HARQ-ACK), or a response message.

Whereas vacancy can be understood as the target resource not being used for transmission, then the idle resource includes at least one of the following: (the device transmitting the power-saving information) does not transmit the first signal/channel, or, any signal/channel, on the idle resource; (the specific device receiving the power-saving information or any device receiving the power-saving information) cannot transmit a second signal/channel, or, any signal/channel, on the idle resource.

The content of the target resource includes:

a specific message, or, any message;

where the specific message includes at least one of the following:

a message having a target content;

a message corresponding to the first target user equipment;

a redundant message;

an invalid message;

a Flag message;

a Bacon message; and a valid message.

Here, the target content is the content of a message with a specific meaning. The redundant message or invalid message can be a full 0 bit string of a fixed length or of a fixed resource size or a full 1 bit string of a fixed length or of a fixed resource size. The valid message can be service-related packets/TB, a media access control (MAC) control element (CE), a radio resource control (RRC) signaling, etc. The arbitrary message can be understood as borne content determined by UE on its own, or, a message corresponding to any UE.

Content borne by the target transmission can be indicated by the power-saving information.

That is, the content borne by the target transmission is indicated by the occupancy information and/or the power-saving indication command. For example, the target transmission is indicated to be the valid message, or the target transmission is indicated to be a message corresponding to the target UE. The target UE may be understood as the first target user equipment.

Based on the above target resource, specifically, step 202 includes the following: (1) the target resource associated with the power-saving information is determined, and K first resources are selected therefrom for the transmission of other power-saving information. For example, the target resource associated with the occupancy information is determined, and K first resources are selected therefrom for the transmission of the power-saving indication command; the target resource associated with the power-saving indication command is determined, and K first resources are selected therefrom for the transmission of the occupancy information.

(2) The target resource associated with the power-saving information is determined, and K first resources are selected therefrom for the target transmission (e.g., target data).

(3) The target resource associated with the power-saving information is determined, and K first resources are selected therefrom as the idle resource.

To determine the first resource, optionally, in this embodiment, step 202 includes:

determine, in the target resource, a first resource indicated by the power-saving information.

Here, the first resource is indicated by the power-saving information, then the first resource can be determined in the target resource by the indication of the power-saving information. Whereas, it is known from the above content that the power-saving information indicates at least part of the target resource, one case in which the power-saving information indicates at least part of the target resource is that the power-saving information indicates the first resource.

On the other hand, optionally, step 202 includes:

determine, in the target resource, a first resource corresponding to specific target parameters; the specific target parameter being one or more of target parameters.

Here, the target parameters can also be understood as preset parameters and can be one or more. Specifically, the target resource corresponding to at least part of the specific target parameter is the first resource.

Optionally, the target parameter includes at least one of the following:

an identifier of user equipment; for example, the identifier of the first target user equipment;
communication-related location information;
power-saving mechanism;
process information;
resource pool information;
carrier information;
bandwidth part information;
an identifier of the power-saving information;
information about the resource of the power-saving information; and
information about the target resource.

Here, the identifier (ID) of the user equipment can be a source identifier (source ID), a destination identifier (destination ID), a member identifier (member ID) or a group identifier (group ID), etc. The communication-related location information can be the communication range, which can be obtained from the zone ID. The power-saving mechanism may include at least one of the following: activation or wake-up; inactivation or dormancy; extended activation or wake-up time; extended inactivation or dormancy time. If the power-saving mechanism is set with a corresponding identifier, the target parameter includes the power-saving mechanism as the ID of the power-saving mechanism, e.g. DRX configuration ID of the target UE. The process information may be the process ID, the resource pool information may be the resource pool ID, the carrier information may be the carrier ID, and the bandwidth part information may be the bandwidth part ID (BWP ID). The information about the resource of the power-saving information may include at least one of the following: ID of the resource of the power-saving information; ID of a resource set of the power-saving information; the number of the resource of the power-saving information in the resource set of the power-saving information; ID of the time-domain resource where the power-saving information is located; ID of the frequency-domain resource where the power-saving information is located; ID of the code-domain resource where the power-saving information is located; the starting frequency-domain resource where the power-saving information is located, such as the starting subchannel or starting RB; the ending frequency-domain resource where the power-saving information is located, such as the ending subchannel or ending RB; the starting time-domain resource where the power-saving information is located; the ending time-domain resource where the power-saving information is located; the number of the frequency-domain resource occupied by the power-saving information; and the number of the time-domain resource occupied by the power-saving information. The information about the target resource includes at least one of the following: ID of the target resource; ID of a target resource set; the number of the target resource contained in the target resource set; ID of the time-domain resource where the target resource is located; ID of the frequency-domain resource where the target resource is located; ID of the code-domain resource where the target resource is located; the starting frequency-domain resource where the target resource is located, such as the starting subchannel or starting RB; the ending frequency-domain resource where the target resource is located, such as the ending subchannel or ending RB; the starting time-domain resource where the target resource is located; the ending time-domain resource where the target resource is located; the number of the frequency-domain resource occupied by the target resource; and the number of the time-domain resource occupied by the target resource.

In this way, for example, if the target parameter is an identifier of the user equipment, the target parameter includes identifiers of one or more user equipment or user equipment within the target user equipment group or any user equipment. The specific target parameter is an identifier associated with the first target user equipment. Preferably, the identifier associated with the first target user equipment is the identifier of a part of user equipment in the first target user equipment.

For example again, if the target parameter is an identifier of the user equipment, the target parameter includes identifiers of one or more user equipment or user equipment within the target user equipment group or any user equipment. The specific target parameter is an identifier of the first user equipment and/or an identifier of the second user equipment.

For example again, if the target parameter is an identifier of the first target user equipment, the target parameter includes identifiers of one or more user equipment, the one or more user equipment is the first target user equipment. The specific target parameter is an identifier of at least part of user equipment in the first target user equipment. Preferably, at least part of the user equipment in the first target user equipment may include first user equipment, or user equipment having an association relationship with the first user equipment.

To determine the first resource based on the target parameter, optionally, before step 202, further including obtaining target parameter indication information, the target parameter indication information indicating at least part of the target parameter required to determine the first resource.

For the target parameter, optionally, a corresponding relationship exists between the target parameter and a second resource; the second resource including at least one of the following:

a resource of the power-saving information,
the first resource; and
the target resource.

Further, the second resource may also be indicated by an identifier of the second resource in this embodiment. Optionally, the identifier of the second resource is determined in at least one of the following ways:

determining according to the ordering number of at least a part of the second resource in time domain;
determining according to the ordering number of at least a part of the second resource in frequency domain; and
determining according to the ordering number of at least a part of the second resource in code domain.

Specifically, the ordering of at least part of the second resource in the time domain, the frequency domain, and the code domain may be in an increasing order, or in a decreasing order.

In this embodiment, ID of the second resource includes at least one of ID of the resource of the power-saving information, ID of the target resource/occasion of the target resource/target resource set associated with the power-saving information, and ID of the power-saving information.

Optionally, in a case that the second resource is the resource of the power-saving information, the identifier of the second resource is an identifier of the resource of the power-saving information or the identifier of the power-saving information;

in a case that the second resource is the target resource, the identifier of the second resource is an identifier of the target resource.

For the second resource being represented by the ID of the second resource, optionally, the corresponding relationship is a correspondence between the target parameter and the identifier of the second resource. That is, the corresponding relationship between the target parameter and the second resource is a correspondence between the target parameter and the identifier of the second resource.

Specifically, the correspondence between the target parameter and the identifier of the second resource includes at least one of the following:

- the result of a module operation the target parameter corresponds to the ID of the second resource;
- the result of dividing the target parameter by a specified value corresponds to the ID of the second resource;
- the ID of the second resource corresponds to the sum of at least two target parameters.

Further, optionally, in this embodiment, the power-saving information and/or the target resource is carried on at least one of the following:

- a physical sidelink control channel PSCCH;
- a physical sidelink feedback channel PSFCH;
- a physical sidelink shared channel PSSCH; and
- a sequence.

Specifically, the power-saving information and/or the target resource is carried on PSCCH, e.g. $1^{st}$ stage SCI (e.g. SCI format 1-A), $x^{th}$ SCI format, x>=0 or x is a letter. The power-saving information and/or the target resource are/is carried on PSSCH, e.g. $2^{nd}$ stage SCI, the data part of PSSCH, and $y^{th}$ SCI format. Preferably, the occupancy information and the power-saving indication command of the power-saving information are transmitted on at least part of the resource of PSCCH, so that both can be demodulated by a PSCCH demodulation reference signal (DMRS).

The power-saving information and/or the target resource may also be carried on other channels/signals other than those described above, such as a channel/signal dedicated to the power-saving information.

Optionally, a frequency-domain resource of the power-saving information and/or the target resource includes at least one of the following:

- at least part of a frequency-domain resource in a target resource block; and
- at least part of a frequency-domain resource in a target subchannel.

Here, the target resource block (RB) may also be understood as the remaining RB, then at least part of the frequency-domain resource in the target resource block is at least part of the frequency-domain resource in the remaining RB, e.g., part of RB in the remaining RB. And the target subchannel may be understood as a predetermined subchannel, including one or more subchannels.

The target resource block includes at least one of the following:

- a resource block having a first identifier in a resource pool or bandwidth part or carrier;
- a resource block of a subchannel other than a subchannel occupied by SCI in a resource occupied by PSSCH scheduled by the first sidelink control information SCI;
- a resource block other than a resource block occupied by SCI in the resource occupied by PSSCH scheduled by the first SCI;
- a resource block other than the resource pool in a resource of the bandwidth part;
- a resource block other than a resource corresponding to PSFCH or PSFCH bitmaps in the resource of the bandwidth part;
- a resource block other than a resource occupied by all or part of subchannels in a resource of the resource pool; and
- a resource block other than the resource corresponding to PSFCH or PSFCH bitmaps in the resource of the resource pool.

Here, the first identifier may be the maximum index, then the resource block with the first identifier in the resource pool or bandwidth part or carrier is H RBs of the maximum index of the resource pool/bwp/carrier. If the first SCI is $1^{st}$ stage SCI, the resource block of the subchannel other than the subchannel occupied by the first SCI, in the subchannel occupied by PSSCH scheduled by the first SCI, is the resource block of the remaining subchannel in the subchannel occupied by PSSCH scheduled by one $1^{st}$ stage SCI after excluding the subchannel occupied by the $1^{st}$ stage SCI. Similarly, the resource block other than the resource block occupied by the first SCI in the subchannel occupied by PSSCH scheduled by the first SCI is the remaining RB in the subchannel occupied by PSSCH scheduled by one $1^{st}$ stage SCI after excluding the RB occupied by the $1^{st}$ stage SCI. The resource block in the bandwidth part other than the resource block of the resource pool is the remaining RB after excluding the RB occupied by the resource pool from the RB contained in BWP. The resource block in the resource pool other than the resource block occupied by all or part of the subchannels is the remaining RB after excluding the RB occupied by all or part of the subchannels from the RB contained in the resource pool. The resource block in the resource pool other than the resource block corresponding to PSFCH or PSFCH bitmaps is the remaining RB in the RB contained in the BWP after excluding the RB corresponding to PSFCH or the RB corresponding to the PSFCH bitmap. The resource block in the bandwidth part other than the resource block corresponding to PSFCH or the PSFCH bitmap, is the remaining RB after excluding the RB corresponding to PSFCH or the RB corresponding to the PSFCH bitmap from the RB contained in the resource pool, e.g., the BWP contains 275 RBs, the size of the subchannel S=10 RB, the number of the subchannel N=20, then 275-S*N=75 RB, at least part of the 75 remaining RBs are the frequency-domain resource that can be used to transmit the power-saving information.

In this way, some frequency-domain resources that cannot be used can be used, and compatibility is achieved.

For the target subchannel, optionally the target subchannel includes at least one of the following:

- a subchannel other than a subchannel occupied by first SCI in a resource occupied by PSSCH scheduled by the first SCI;
- a subchannel other than a subchannel occupied by first SCI in a resource occupied by PSSCH scheduled by the first SCI;

- a subchannel other than a resource pool in a bandwidth part;
- a subchannel other than a resource corresponding to PSFCH or PSFCH bitmaps in the bandwidth part;
- a subchannel other than a resource occupied by all or part of subchannels in a resource pool;
- a subchannel other than the resource corresponding to PSFCH or PSFCH bitmaps in the resource pool;
- a subchannel in the resource pool, a frequency domain of which satisfies the first condition;
- a subchannel having a second identifier;
- a subchannel having a first number of resource blocks; and
- a subchannel including at least a subchannel where the power-saving information is located.

If the first condition is N1 subchannels in the lowest frequency domain, the target subchannel is N1 subchannels in the lowest frequency domain of the resource pool, e.g., N1=2, the target subchannel is two subchannels in the lowest and second lowest frequency domain of the resource pool. Of course, the first condition can also be N3 subchannels in the highest frequency domain, the target subchannel is N3 subchannels in the highest frequency domain of the resource pool, e.g., N3=2, the target subchannel is two subchannels in the highest and second highest frequency domain of the resource pool.

If the second identifier is the minimum index, then the target subchannel is the subchannel with the minimum index. Of course, if the second identifier also corresponds to the number N2 of the subchannel, the target subchannel is N2 subchannels with the minimum index, e.g., N2=2, the target subchannel is two subchannels with index=0 and 1. Of course, the second identifier can also be the maximum index and corresponds to the number N4 of the subchannel, then the target subchannel is N4 subchannels with the maximum index, for example, N4=2, the maximum index of the subchannel is 9, and then the target subchannel is two subchannels with index=9 and 8.

The first quantity is limited to the number of RB of the subchannel, specifically, the first quantity is determined based on the number of all or part of the subchannels, the number of RB of each subchannel, and the number of the target subchannel, if the number of the target subchannel is N5, the target subchannel is N5 subchannels containing the smallest number of RB, e.g., if N5=5, with the first smallest number of RB being the smallest number of RB, the first quantity is determined by the number of RB of the subchannel with the fifth smallest number of RB.

A subchannel including at least the subchannel where the power-saving information is located, may be the subchannel where the power-saving information is located, i.e. the (candidate) frequency-domain resource of the target resource is the subchannel where the power-saving information is located, preferably, in which case the target resource is the idle resource; it may be multiple (e.g., I) subchannels including the subchannel where the power-saving information is located, i.e., the (candidate) frequency-domain resource of the target resource is I subchannels including the subchannel where the power-saving information is located, preferably, the I subchannels start from or end with the subchannel where the power-saving information is located.

Of course, the target subchannel may also be any subchannel.

Optionally, a time-domain resource of the power-saving information and/or the target resource includes at least one of the following:

- symbols other than at least part of symbols of a first channel or signal in the first symbol;
- at least part of symbols in symbols used for automatic gain control (AGC);
- a first symbol in symbols used for sidelink transmission;
- at least part of symbols in symbols of PSCCH; and
- at least part of symbols in symbols of SCI.

The first symbol may be a symbol for SL transmission, then at least part of symbols other than at least part of symbols of the first channel/signal (preset channel/signal) in the first symbol, are the remaining symbols after removing at least part of the symbols of the preset channel/signal in the symbols used for SL. Correspondingly, the time-domain resource of the power-saving information and/or the target resource is the remaining symbol after removing (candidate) time-domain symbols of the preset channel/signal in the symbols that can be used for SL. In this way, it avoids that the introduced power-saving information can cause too strong interference to the preset channel/signal or avoids that the power-saving information knocks out the existing preset channel/signal. Here, the first channel/signal includes at least one of the following: 1$^{st}$ stage SCI; 2$^{nd}$ stage SCI; DMRS; CSI-RS; PT-RS; P-RS; PBSCH; S-primary synchronization signal (PSS); S-SSS. DMRS can be at least one of PSSCH DMRS and PSCCH DMRS. For example, the (candidate) symbol of the power-saving information is at least one symbol in the remaining symbols in the symbols, where PSSCH is located, that do not contain PSSCH DMRS.

For at least part of symbols in the symbols of PSCCH or SCI, specifically it can be that the time-domain resource (i.e. (candidate) time-domain symbol) of the power-saving information is the 2$^{nd}$ and 3$^{rd}$ symbols in the symbols used for SL. This allows the design of the 1$^{st}$ stage SCI to be reused for the design of the power-saving information.

Further, optionally, in this embodiment, the resource of the power-saving information and/or the target resource are different in at least one of the following:

- a channel or signal carrying the information;
- a frequency-domain resource;
- a time-domain resource; and
- a code-domain resource.

For example, if the carrying channel is different, preferably, the power-saving information is transmitted on PSCCH and the target resource is transmitted on PSSCH.

The power-saving information includes occupancy information and/or a power-saving indication command. Optionally, a resource of the occupancy information and a resource of the power-saving indication command are different in at least one of the following:

- a channel or signal carrying the information;
- a frequency-domain resource;
- a time-domain resource; and
- a code-domain resource.

For example, the locations of the (candidate) time-domain/frequency-domain resource of the occupancy information and the power-saving indication command may be different or the same, and the number of the time-domain/frequency-domain resources may be different or the same. The (candidate) time-domain/frequency-domain resource of the occupancy information and the power-saving indication command can be defined in the method same as that in the time-domain/frequency-domain resource of the power-saving information above, or in a different method, and the value of at least one of N1, N2, N3, N4, and N5 corresponding to the occupancy information and the power-saving indication command can be the same or different. Specifically, if the configuration of the frequency-domain resource of the occupancy information and the power-saving indication command can be acquired separately (configured) and can be configured or pre-configured using separate parameters; or can be acquired together (configured), e.g., configured or pre-configured using the same parameter, then the (candidate) frequency-domain resource of the occupancy information is part of the resource of the subchannel with the minimum index, and the (candidate) frequency-domain resource of the power-saving indication command is part of the resource of the subchannel with the minimum index;

the (candidate) frequency-domain resource for the occupancy information is part of the resource of the subchannel with the minimum index, and the (candidate) frequency-domain resource of the power-saving indication command is part of the resource of two subchannels with the maximum index;

the (candidate) time-domain resource of the occupancy information is the (candidate) symbol of PSCCH, i.e., the $2^{nd}$ and $3^{rd}$ symbols in the symbols that can be used for SL, and the (candidate) time-domain resource of the power-saving indication command is part of symbols in the remaining symbols of the (candidate) symbols of PSSCH, which do not contain DMRS and $2^{nd}$ stage SCI;

the (candidate) time-domain resource of the occupancy information is the symbol that can be used for AGC, i.e., the $1^{st}$ symbol in the symbols that can be used for SL, and the (candidate) time-domain resource of the power-saving indication command is the (candidate) symbol of PSCCH, i.e., the $2^{nd}$ and $3^{rd}$ symbols in the symbols that can be used for SL.

If the occupancy information and the power-saving indication command are carried on different channels or signals: one possibility is that the occupancy information is carried in PSCCH or $1^{st}$ stage SCI, and the power-saving indication command is carried in PSSCH or $2^{nd}$ stage SCI or $3^{rd}$ SCI.

Further, optionally, in this embodiment, a time-domain resource of the power-saving information satisfies at least one of the following conditions:

the number of repetitions on the time domain being not less than a second number;

having a third number of repetitions on the time domain;

occupying Y time-domain units, Y being equal to the number of time-domain units used for sidelink transmission.

Therefore, the time-domain resource of the power-saving information may be that the power-saving information performs repetition R times on the time domain (i.e., the second number is less than or equal to R, or the third number is R), or the power-saving information occupies Y time-domain units.

Figures 3, 4, 5:
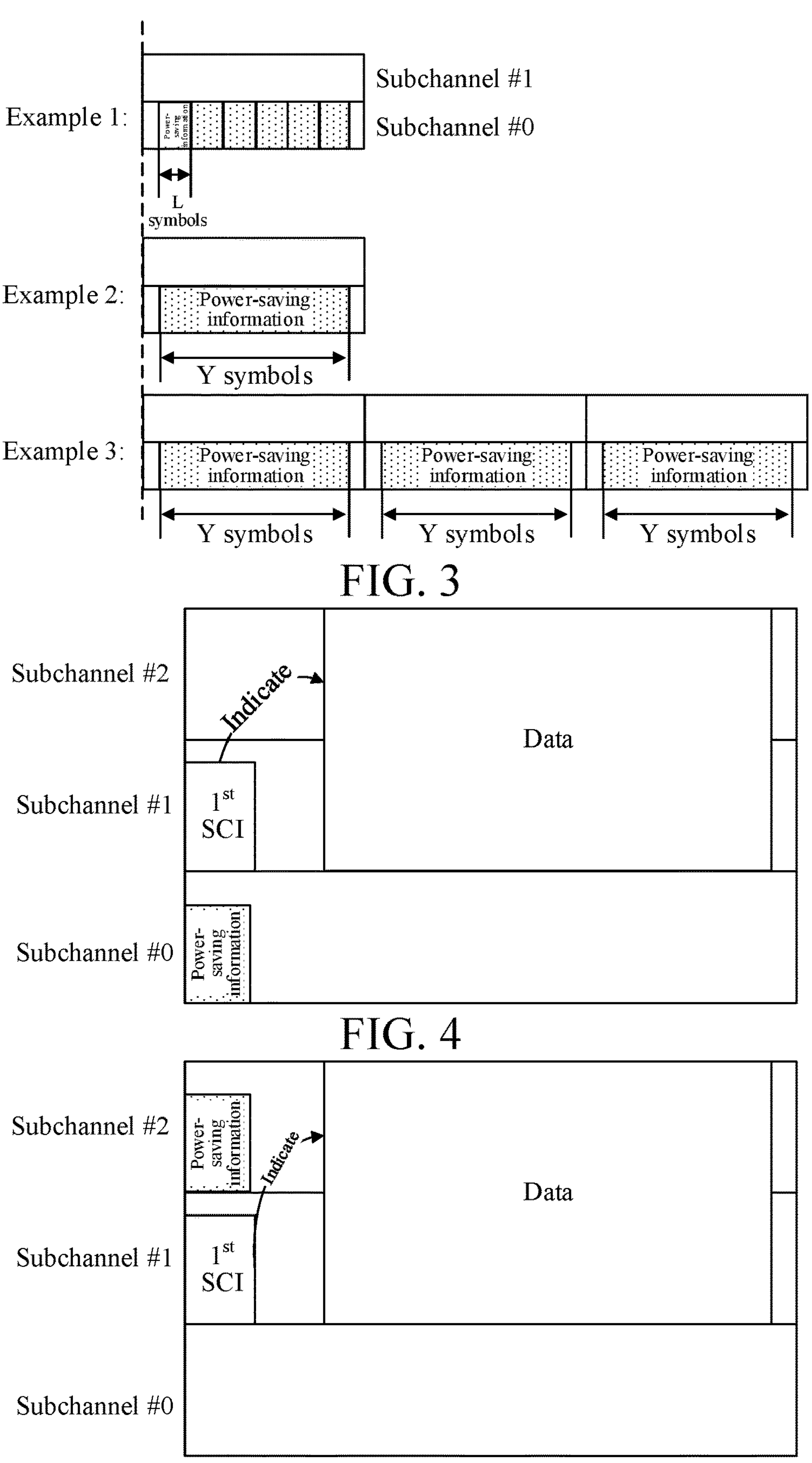
FIG. 3 is a schematic application diagram I of the method for selecting a resource according to the embodiment of this application.
FIG. 4 is a schematic application diagram II of the method for selecting a resource according to the embodiment of this application.
FIG. 5 is a schematic application diagram III of the method for selecting a resource according to the embodiment of this application.

For example, the design of the time-domain resource of the power-saving information includes at least one of the following: occupying L symbols, and repeating R times according to the granularity of the L symbols; and occupying Y symbols. Optionally, R=Y/L or R is a rounded value of the result of dividing Y by L. As shown in FIG. 3, Example 1, the time-domain resource of the power-saving information (the shaded part in the figure) occupies L symbols and repeats R times according to the granularity of the L symbols, then, R=5; Example 2, the time-domain resource of the power-saving information occupies Y symbols; Example 3, the time-domain resource of the power-saving information occupy Y symbols, and repeats R times according to the granularity of the L symbols, then, R=3.

Optionally, there is no multiplexing between the power-saving information and a second channel or signal.

That there is multiplexing between the power-saving information and the second channel or signal includes:

there is no frequency division multiplexing between the power-saving information and the second channel or signal; or, there is no overlap between the time-domain resource of the power-saving information and a time-domain resource of the second channel or signal;

where, the second channel or signal is a channel or signal other than the power-saving information.

For example, the second channel/signal is a dedicated slot or symbol for the power-saving information. Again, for example, in a case that the power-saving information is at the tail or head of the SL slot, the second channel/signal may be a part of the SL slot other than the tail or head, then, there is no multiplexing between the power-saving information and the second channel/signal.

Optionally, sequences carried on different target resources are different.

Then it can also be understood that the sequences carried on different target time-domain resources are different, and the target time-domain resource is the time-domain resource of the target resource; the sequences carried on different target frequency-domain resources are different, and the target frequency-domain resource is the frequency-domain resource of the target resource. And the ways in which the sequences are different include at least one of the following: different base sequences; different cyclic shifts; and different polynomials.

Optionally, in this embodiment, the method further includes:

obtaining information about the power-saving information and/or information about the target resource.

Thus, the (candidate) resource of the power-saving information can be determined based on the obtained information (e.g. resource information) about the power-saving information. The (candidate) target resource may be determined based on the obtained information (e.g. resource information) about the target resource.

The information about the power-saving information and/or the information about the target resource include/includes at least one of the following:

information about the frequency-domain resource;

information about the time-domain resource;

the period of the resource;

the number of the resource;

the priority of the resource; and the proportion in the resource pool or at a given time.

Here, the information about the frequency-domain resource may specifically be information such as the number/location of the occupied subchannel/RB/interlace/comb, and/or time-domain offsets, etc. The information about the time-domain resource may specifically be information such as the number/location/periodicity of the occupied symbol/slot/mini-slot/ms/subframe/frame, and/or frequency-domain offsets, etc.

Optionally, the target resource is obtained in at least one of the following ways: configuration; pre-configuration; and pre-definition;

Optionally, the method further includes:

obtaining transmission parameters; and performing transmission on the first resource according to the transmission parameter.

The transmission parameters may be the same or different for the first resource corresponding to different purposes.

The first resource is the resource of the target transmission, and if the target transmission is target data, the transmission parameter includes at least one of the carried content, new transmission or retransmission indication, Priority, process ID, TB size, value of PSFCH indication, MCS, MCS table, rank, SCI format, DMRS pattern, DMRS density, number of ports, period, number of occupied time-domain resources, number of occupied frequency-domain resources, locations of the occupied time-domain resources, locations of the occupied frequency-domain resources, upper or lower limit of the number of the occupied resources, Beta_offset, source ID, destination ID, HARQ feedback enabled/disabled indicator, Cast type, CSI request indication, and Zone ID, which may be configured, pre-configured, or pre-defined. If the target transmission is target feedback, the transmission parameter thereof includes at least one of the carried content (e.g., HARQ-ACK state), new transmission or retransmission indication, Priority, sequence used, cyclic shift, process ID, MCS, MCS table, rank, SCI format, DMRS pattern, DMRS density, number of ports, period, number of occupied time-domain resources, number of occupied frequency-domain resources, locations of the occupied time-domain resource, locations of the occupied frequency-domain resource, upper or lower limit of the number of the occupied resources, Beta_offset, source ID, destination ID, Cast type, and Zone ID, which may be configured, pre-configured, or pre-defined.

In this embodiment, preferably, the (candidate) time-domain resource of the power-saving information may be located before/during/after the activation time.

In this embodiment, the $1^{st}$ stage SCI may be SCI format 1-x, e.g. 1-A; the $2^{nd}$ stage SCI may be SCI format 2-y, e.g. 2-A and/or 2-B.

In this embodiment, the domain associated with the $2^{nd}$ SCI format carried by the power-saving information is invalid or set to a special value in a case that at least one of the following is satisfied:

the power-saving information reuses the $1^{st}$ stage SCI format and is transmitted on PSCCH;

the power-saving information indicates at least one target resource.

The special value is all 1 or all 0 or fixed content. In this case, there may be no $2^{nd}$ SCI format transmitted and the domain associated with the $2^{nd}$ SCI format needs to be invalidated. Actually, a virtual $2^{nd}$ SCI format exists.

For AGC/GP of the power-saving information, the AGC symbol may be necessary, but the GP symbol may not be necessary, because the direction of transmission between the occupancy information and the power-saving indication command may be constant for one UE.

Optionally, at least time-domain units (e.g. symbols) for AGC and for GP exist between the time-domain resources of two adjacent power-saving information.

Optionally, at least a time-domain unit (e.g. symbol) for GP exists between the time-domain resources of two adjacent power-saving information.

Optionally, at least a time-domain unit (e.g. symbol) for AGC exists between the time-domain resources of two adjacent power-saving information.

Optionally, the time-domain resources of two adjacent power-saving information are continuous.

Further, the first A time-domain units (e.g., A symbols) of the time-domain resource of the power-saving information may be used for the time-domain unit (e.g., symbol) of AGC.

Optionally, at least time-domain units (e.g. symbols) for AGC and for GP exist between the time-domain resources of the occupancy information and the power-saving indication command.

Optionally, at least a time-domain unit (e.g., symbol) for GP exists between the time-domain resources of the occupancy information and the power-saving indication command.

Optionally, at least a time-domain unit (e.g., symbol) for AGC exists between the time-domain resources of the occupancy information and the power-saving indication command.

Optionally, the time-domain resources of the occupancy information and the power-saving indication command are continuous.

Further optionally, the first A1 time-domain units (e.g., symbols) of the time-domain resource of the occupancy information may be used for AGC.

Further optionally, the first A2 time-domain units (e.g., symbols) of the time-domain resource of the power-saving indication command may be used for AGC.

Optionally, the above time-domain unit that can be used for guard period (GP) can also be at least one of a time-domain unit for receiving and transmitting conversion, a time-domain unit for power adjustment, a time-domain unit for technology switching, and a time-domain unit for RF adjustment.

For the relationship between the power-saving information (occupancy information and/or power-saving indication command), the target resource, and the target transmission above, there may be several solutions below (the figure is only an example and does not represent the only implementation of the solution):

1) The power-saving information can use $1^{st}$ stage SCI or the resource of PSCCH, and the power-saving information has no associated target resources.

The power-saving information may be transmitted using the $1^{st}$ stage SCI format (but the resource of PSCCH may or may not be used, e.g. at least part of the remaining RB is used) or directly using at least part of the resource of PSCCH, e.g. transmitted on the $2^{nd}$ and $3^{rd}$ symbols in the symbols that can be used for SL. Here, there is no restriction on whether the power-saving information contains the occupancy information.

One possible implementation method is that the power-saving information is transmitted on the resource of PSCCH and occupies a frequency-domain resource less than or equal to a subchannel, and then, the power-saving information is similar to a piece of standalone $1^{st}$ stage SCI. Another possible implementation method is that the power-saving information is transmitted on the remaining RB. Further optionally, the power-saving information reuses the SCI format, and then, the power-saving information is similar to a piece of standalone SCI.

As shown in FIG. 4, a piece of $1^{st}$ stage SCI occupies the resource of PSCCH on the subchannel #1 and schedules data, while the power-saving information (the shaded part in the figure, the same below) uses the resource of PSCCH on the subchannel #0.

As shown in FIG. 5, the power-saving information can be transmitted on the remaining subchannels that are not occupied by the $1^{st}$ stage SCI in the data part of the bandwidth scheduled by the $1^{st}$ stage SCI.

As shown in FIG. 6, the power-saving information can be transmitted on the RB that is not occupied by the $1^{st}$ stage SCI in the data part of the bandwidth scheduled by the $1^{st}$ stage SCI.

In this way, the detection complexity of the power-saving information is low, and it may be possible to determine the power-saving information at the time of receiving/sensing.

2) The power-saving information can use the $1^{st}$ stage SCI or the resource of PSCCH, and the power-saving information has an associated target resource.

The power-saving information may be transmitted using the $1^{st}$ stage SCI format (but the resource of PSCCH may or may not be used, e.g. at least part of the remaining RB is used) or directly using at least part of the resource of PSCCH, e.g. transmitted on the $2^{nd}$ and $3^{rd}$ symbols in the symbols that can be used for SL. Here, there is no restriction on whether the power-saving information contains the occupancy information.

One possible implementation method is that the power-saving information is transmitted on the resource of PSCCH and occupies a frequency-domain resource less than or equal to a subchannel, and the power-saving information is associated with the target resource. Another possible implementation method is that the power-saving information is transmitted on the remaining RB, and the power-saving information is associated with the target resource. Further optionally, the power-saving information reuses the SCI format.

2a: If the target resource is associated by appointing the target resource corresponding to the power-saving information, then, the power-saving information is similar to a piece of standalone $1^{st}$ stage SCI, although there is an accompanying target resource, e.g., the protocol appoints that the power-saving information will be associated with a target resource that occupies two subchannels where the starting subchannel is the same as the subchannel where the power-saving information is located as in FIG. 7, the power-saving information may not indicate the target resource, and then the target resource of the figure is determined after the power-saving information detected and recognized by a user is received. In FIG. 7, the target resource is on PSSCH.

Optionally, as shown in FIG. 7, if the target resource is associated by means of the power-saving information indicating that target resource, then, the power-saving information is similar to a piece of $1^{st}$ stage SCI that has scheduled the resource of PSSCH.

Figures 27, 28:
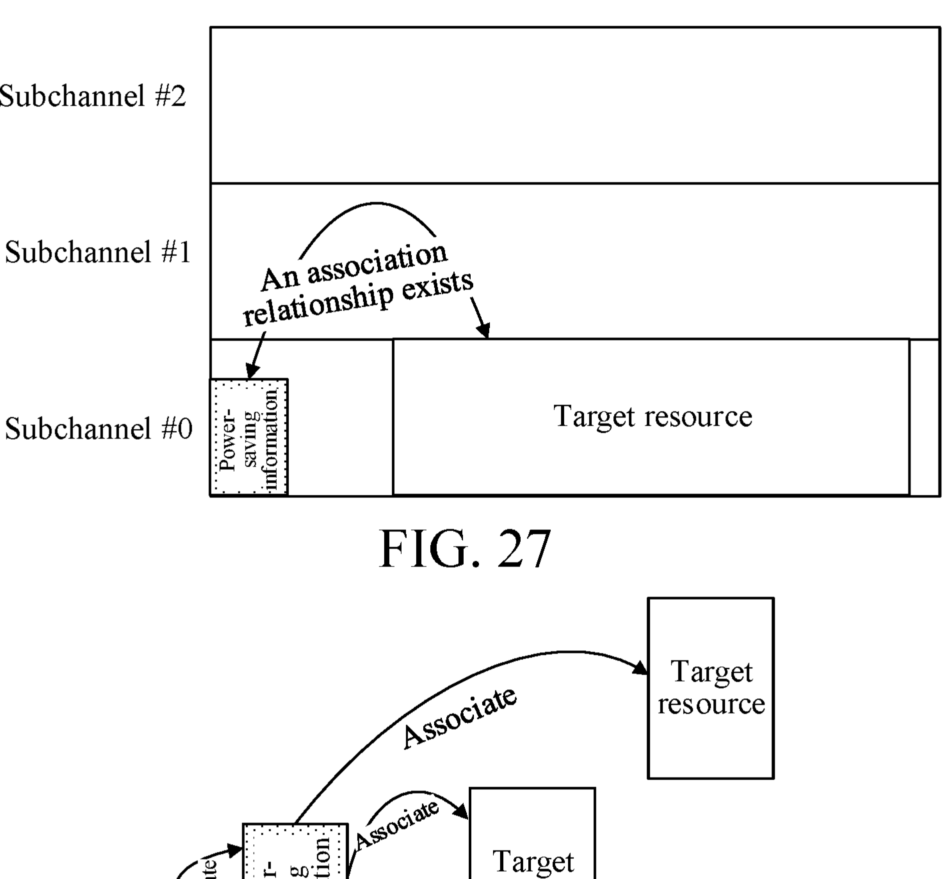
FIG. 27 is a schematic application diagram XX of the method for selecting a resource according to the embodiment of this application.
FIG. 28 is a schematic application diagram XXI of the method for selecting a resource according to the embodiment of this application.

Optionally, as shown in FIG. 27, the frequency-domain resource of the target resource may also be the subchannel where the power-saving information is located, i.e., the power-saving information will associate a target resource that occupies one subchannel which is the subchannel where the power-saving information is located, and the power-saving information may or may not indicate the target resource.

In this way, the detection complexity of the power-saving information is low, and it may be possible to determine the power-saving information at the time of receiving/sensing. And the associated power-saving information may be used for transmitting data, or used for transmitting part of the information about the power-saving indication information (especially in a case that the number of bits of the power-saving information is high), or not used for transmission.

Further, if the resource indication method in the existing setup is reused and the resource indication domain within the power-saving information indicates the target resource, then, the resource indication domain in the power-saving information can be recognized by other UE and the other UE will assume that the target resource has been already occupied, thus avoiding the situation that other UE uses the target resource, which causes conflicts.

Figure 9:
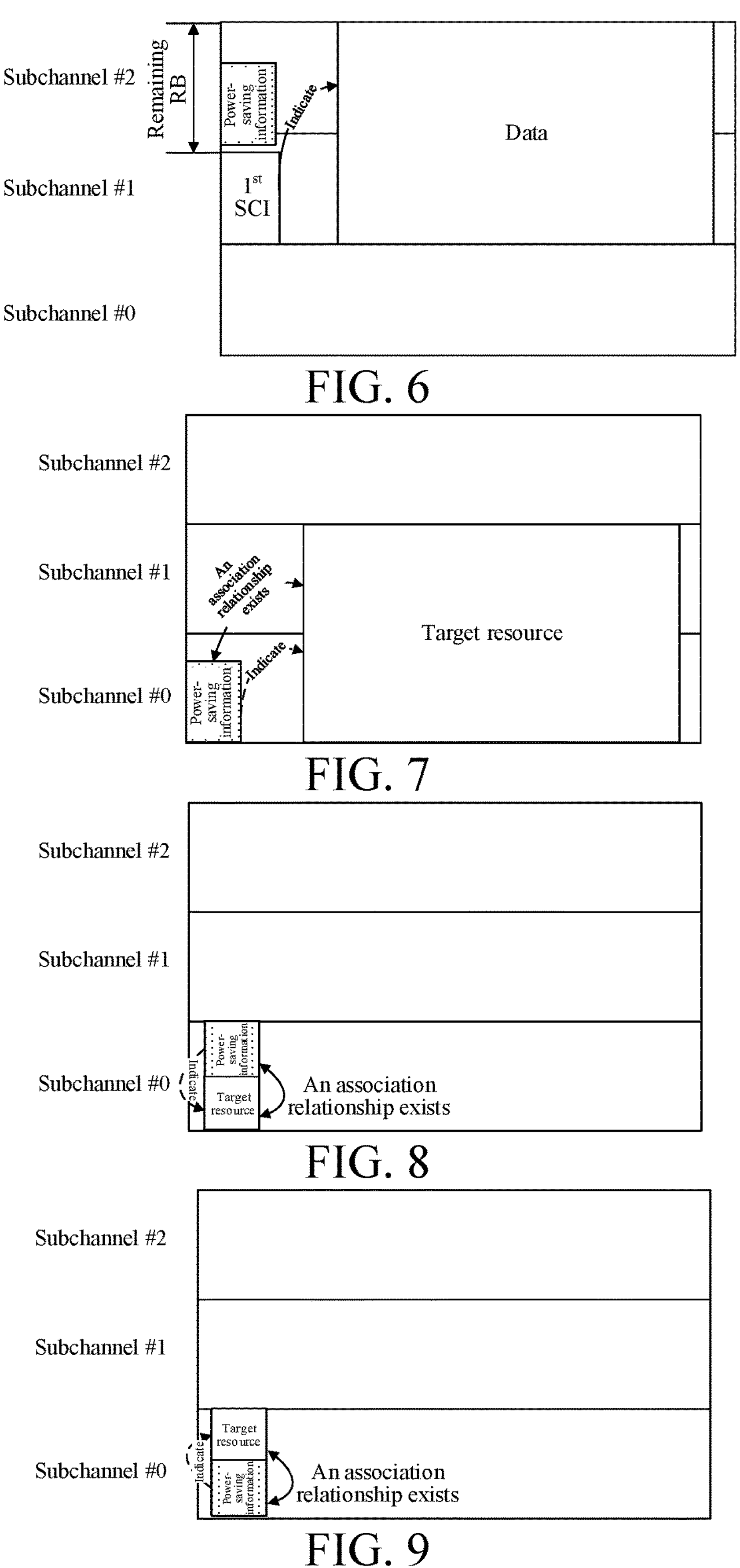
FIG. 9 is a schematic application diagram VII of the method for selecting a resource according to the embodiment of this application.

2b: As shown in FIG. 8 and FIG. 9, the power-saving information and the target resource in the figures are on PSCCH. Optionally, if this target resource is associated by means of the power-saving information indicating the target resource, then, the power-saving information is similar to a piece of SCI that has scheduled the resource of PSCCH.

In this way, the detection complexity of the power-saving information is low, and it may be possible to determine the power-saving information at the time of receiving/sensing.

3) The power-saving information is transmitted within the $2^{nd}$ stage SCI or the $N^{th}$ stage SCI or PSSCH.

The power-saving information can be transmitted using the $2^{nd}$ stage SCI or the $N^{th}$ stage SCI or the resource of PSSCH, and there is no restriction here on whether the power-saving information contains the occupancy information.

For example, as shown in FIG. 10, the power-saving information is carried in the $2^{nd}$ stage SCI or the $N^{th}$ stage SCI or PSSCH, where the $N^{th}$ stage SCI is the control signaling (e.g., SCI or MAC CE or RRC) indicated by the $1^{st}$ stage SCI or the $2^{nd}$ stage SCI or other SCI. Further optionally, N>2 or N is not 2-A and 2-B.

For example, as shown in FIG. 11, the power-saving information is carried within the TB that can be used for PSSCH carrying.

For example, as shown in FIG. 12, part of the power-saving information is also carried within the target resource associated with the power-saving information.

In this way, more bits can be carried in the power-saving information.

4) The power-saving information is on PSCCH or PSFCH, and the target resource is on the PSFCH symbol.

For example, as shown in FIG. 13, the occupancy information may be transmitted using the $1^{st}$ stage SCI format (but the resource of PSCCH may or may not be used, e.g. at least part of the remaining RB is used) or directly using the $1^{st}$ stage SCI or at least part of the resource of PSCCH, e.g. transmitted on the $2^{nd}$ and $3^{rd}$ symbols in the symbols that can be used for SL. The associated target resource uses a part of the frequency-domain resource other than RB, used by PSFCH on the symbol where PSFCH is located, or uses at least part of the resource of PSFCH.

Figures 14, 15, 16, 17:
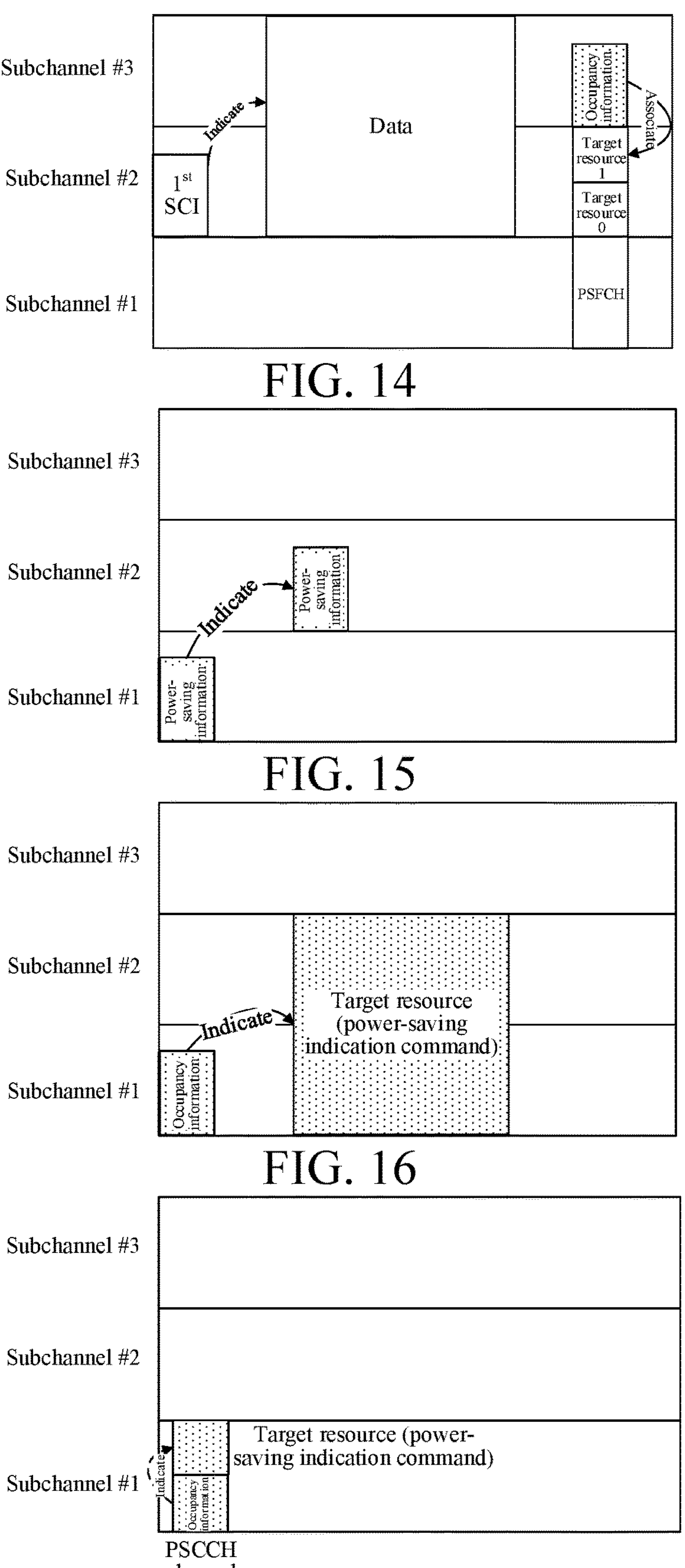
FIG. 14 is a schematic application diagram XII of the method for selecting a resource according to the embodiment of this application.
FIG. 15 is a schematic application diagram XIII of the method for selecting a resource according to the embodiment of this application.
FIG. 16 is a schematic application diagram XIV of the method for selecting a resource according to the embodiment of this application.
FIG. 17 is a schematic application diagram XV of the method for selecting a resource according to the embodiment of this application.

For example, as shown in FIG. 14, the occupancy information and the associated target resource are transmitted using a part of the frequency-domain resource other than RB, used by PSFCH on the symbol where PSFCH is located, or uses at least part of the resource of PSFCH 5) The power-saving information has only one target resource, and the target resource is used for the target transmission.

5a: The power-saving information has an associated target resource and the target resource is used for the target transmission (target data and/or target feedback).

Further, in one implementation method, the power-saving information may be transmitted using the $1^{st}$ stage SCI format (but the resource of PSCCH may or may not be used, e.g. at least part of the remaining RB is used) or directly using at least part of the resource of PSCCH, e.g. transmitted on the $2^{nd}$ and $3^{rd}$ symbols in the symbols that can be used for SL. The associated target resource uses the resource of PSSCH. The target resource can be used for transmitting target data. Another possible implementation method is that the power-saving information is transmitted on the remaining RB, and the associated target resource uses the resource of PSSCH. The target resource can be used for transmitting target data. Further optionally, the power-saving information reuses the SCI format.

5b: The power-saving information has an associated target resource and the target resource is used for transmitting the power-saving information.

As shown in FIG. 15, further, in one implementation method, the power-saving information may be transmitted using the 1st stage SCI format (but the resource of PSCCH may or may not be used, e.g. at least part of the remaining RB is used) or directly using at least part of the resource of PSCCH, e.g. transmitted on the 2nd and 3rd symbols in the symbols that can be used for SL. The associated target resource uses the resource of PSSCH. The target resource can be used for transmitting the power-saving information. Another possible implementation method is that the power-saving information is transmitted on the remaining RB, and the associated target resource uses the resource of PSSCH. The target resource can be used for transmitting the power-saving information. Further optionally, the power-saving information reuses the SCI format.

5c: The power-saving information contains the occupancy information and the power-saving indication command, and the occupancy information has a target resource for transmitting the power-saving indication command.

The power-saving information contains the occupancy information and the power-saving indication command, the power-saving information has an associated target resource, and the target resource is used for transmitting the power-saving indication command.

Further, as shown in FIG. 16, in one implementation method, the occupancy information may be transmitted using the 1st stage SCI format (but the resource of PSCCH may or may not be used, e.g. at least part of the remaining RB is used) or directly using at least part of the resource of PSCCH, e.g. transmitted on the 2nd and 3rd symbols in the symbols that can be used for SL. The associated target resource uses the resource of PSSCH. The target resource carries the power-saving indication command. Another possible implementation method is that the occupancy information is transmitted on the remaining RB, and the associated target resource uses the resource of PSSCH. The target resource can be used for transmitting the power-saving indication command. Further optionally, the occupancy information reuses the SCI format.

Further, as shown in FIG. 17, in one implementation method, the occupancy information may be transmitted using the 1st stage SCI format (but the resource of PSCCH may or may not be used, e.g. at least part of the remaining RB is used) or directly using at least part of the resource of PSCCH, e.g. transmitted on the 2nd and 3rd symbols in the symbols that can be used for SL. The associated target resource uses the resource of PSCCH. The target resource carries the power-saving indication command. Another possible implementation method is that the occupancy information is transmitted on the remaining RB, and the associated target resource uses the resource of PSCCH. The target resource can be used for transmitting the power-saving indication command. Further optionally, the occupancy information reuses the SCI format.

As a specific example, as shown in FIG. 18, the occupancy information reuses the 1st SCI format and is transmitted on PSCCH, the occupancy information indicates the power-saving indication command, the power-saving indication command reuses the 1st SCI format and is transmitted on PSCCH, and further optionally, the occupancy information and/or the power-saving indication command indicate/indicates the accompanying PSSCH. In this way, the occupancy information and the power-saving indication command can both be demodulated using PSCCH DMRS.

5d: The power-saving information has a target resource which is an occupancy resource.

The power-saving information has an associate target resource and the target resource is an occupancy resource.

Further, as shown in FIG. 19, in one implementation method, the occupancy information may be transmitted using the 1st stage SCI format (but the resource of PSCCH may or may not be used, e.g. at least part of the remaining RB is used) or directly using the resource of PSCCH, e.g. transmitted on the 2nd and 3rd symbols in the symbols that can be used for SL. The associated target resource uses the resource of PSSCH. The target resource is not used. Another possible implementation method is that the occupancy information is transmitted on the remaining RB, and the associated target resource is not used for transmission. Further optionally, the occupancy information reuses the SCI format.

6) The power-saving information has a plurality of target resources.

The power-saving information is associated with a group of target resources, optionally, the power-saving information is associated with two target resources; as shown in FIG. 28, the power-saving information is associated with three target resources, and the three target resources contain the resource where the power-saving information is located; the power-saving information is associated with sixteen target resources.

As shown in FIG. 20, the occupancy information is associated with sixteen target resources. In one implementation method, the occupancy information may be transmitted using the 1st stage SCI format (but the resource of PSCCH may or may not be used, e.g. at least part of the remaining RB is used) or directly using at least part of the resource of PSCCH, e.g. transmitted on the 2nd and 3rd symbols in the symbols that can be used for SL. The associated target resource uses the resource of PSSCH. Optionally, the target resource is used for transmitting the power-saving indication command. Another possible implementation method is that the occupancy information is transmitted on the remaining RB, and the associated target resource uses the resource of PSSCH. Optionally, the target resource is used for transmitting the power-saving indication command. Further optionally, the occupancy information reuses the SCI format.

Further assuming that the ID of the UE sending the power-saving information is 31, then the first resource is 31 mod 16=15, and then the target resource 15 is selected for transmitting the power-saving indication command.

Further assuming that the group ID of the UE sending the power-saving information is 31, then the first resource is 31 mod 16=15, and then the target resource 15 is selected for transmitting the power-saving indication command.

Further assuming that the ID of the UE sending the power-saving information is 31, then the first resource is floor (31/16)=1, and then the target resource 1 is selected for transmitting the power-saving indication command.

Further assuming that the group ID of the UE sending the power-saving information is 31, then the first resource is floor (31/16)-1, and then the target resource 1 is selected for transmitting the power-saving indication command.

Further assuming that the ID of the UE sending the power-saving information is 3 and the ID of the target UE is 10, then the first resource is (3+10) mod 16=13, and then the target resource 13 is selected for transmitting the power-saving indication command.

Further assuming that the ID of the UE sending the power-saving information is 3 and the group ID of the target UE is 10, then the first resource is (3+10) mod 16=13, and then the target resource 13 is selected for transmitting the power-saving indication command.

Further assuming that the source ID is 3 and the destination ID is 10, then the first resource is (3+10) mod 16=13, and then the target resource 13 is selected for transmitting the power-saving indication command.

Further assuming that the ID of the UE sending the power-saving information is 3 and the ID of the target UE is 10, then the first resource is floor ((3+10)/16)–0, and then the target resource 0 is selected for transmitting the power-saving indication command.

Further assuming that the ID of the UE sending the power-saving information is 3 and the group ID of the target UE is 10, then the first resource is floor ((3+10)/16)–0, then the target resource 0 is selected for transmitting the power-saving indication command.

Further assuming that the source ID is 3 and the destination ID is 10, then the first resource is floor ((3+10)/16)–0, and then the target resource 0 is selected for transmitting the power-saving indication command.

Further assuming that the ID of DRX controlled by the power-saving information is 3, then the first resource is (3) mod 16-3, then the target resource 3 is selected for transmitting the power-saving indication command.

Floor is rounded down, and in addition to rounding down, rounding up can also be considered.

Before this, optionally, the target resource can also be used for the target transmission or used as an occupancy resource, which will not be described in detail here.

In this way, multiple UE shares the resource of the occupancy information and transmits the occupancy information on the resource of the occupancy information so that the associated target resource is known upon detection of the occupancy information. The UE determines the first resource from the associated target resource for transmission according to the rules, thus avoiding conflicts between power-saving indication commands of different UE.

(7) The target resource associated with multiple pieces of power-saving information is same in part.

The power-saving information is associated with a group of target resources, e.g. two pieces of power-saving information are associated with 16 same target resources.

As shown in FIG. 21, in one implementation method, the occupancy information may be transmitted using the $1^{st}$ stage SCI format (but the resource of PSCCH may or may not be used, e.g. at least part of the remaining RB is used) or directly using at least part of the resource of PSCCH, e.g. transmitted on the $2^{nd}$ and $3^{rd}$ symbols in the symbols that can be used for SL. The associated target resource uses the resource of PSSCH. Optionally, the target resource is used for transmitting the power-saving indication command. Another possible implementation method is that the occupancy information is transmitted on the remaining RB, and the associated target resource uses the resource of PSSCH. Optionally, the target resource is used for transmitting the power-saving indication command. Further optionally, the occupancy information reuses the SCI format.

Further assuming that the ID of the time-domain resource of the power-saving information is 0 and the size of a target resource set is 10, then the first resource is (0*10) mod 16-0, and then the target resource 0 is selected for transmitting the power-saving indication command.

Further assuming that the ID of the time-domain resource of the power-saving information is 1 and the ID of the target UE is 10, then the first resource is (1*10) mod 16=10, and then the target resource 10 is selected for transmitting the power-saving indication command.

Further assuming that the ID of the time-domain resource of the power-saving information is 0 and the size of a target resource set is 10, then the first resource is (0*10)/16=0, and then the target resource 0 is selected for transmitting the power-saving indication command.

Further assuming that the ID of the time-domain resource of the power-saving information is 1 and the ID of the target UE is 10, then the first resource is floor ((1*10)/16)–0, and then the target resource 0 is selected for transmitting the power-saving indication command.

Floor is rounded down, and in addition to rounding down, rounding up can also be considered.

Optionally, the target resource can also be used for the target transmission or used as an occupancy resource, which will not be described in detail.

In this way, multiple UE shares the resource of the occupancy information and transmits the occupancy information on the resource of the occupancy information so that the associated target resource is known upon detection of the occupancy information. The UE determines the first resource from the associated target resource for transmission according to the rules, thus avoiding conflicts between power-saving indication commands of different UE.

In addition, in this application, optionally, the method further includes:

transmit the power-saving information.

From the above content, it can be seen that the first user equipment is able to use the first resource for the transmission of the power-saving information. Then, preferably, the first resource indicated by the power-saving information, is part of the indicated target resource indicated by the power-saving information.

Optionally, the first user equipment is a transmitting end of a target item and in a case that the power-saving information indicates inactivation or dormancy, the first user equipment stops transmitting the target item;

the resource of the power-saving information and/or the target resource associated with the power-saving information are/is a dedicated resource, or the resource of the power-saving information and/or the target resource associated with the power-saving information are/is a common resource.

Correspondingly, the second user equipment receiving the power-saving information is a receiving end of the target item:

in a case that the resource of the power-saving information and/or the target resource associated with the power-saving information are/is a dedicated resource, the second user equipment executes at least one of inactivation or dormancy, and stopping receiving the target item in a case that the power-saving information indicates inactivation or dormancy. in a case that the resource of the power-saving information and/or the target resource associated with the power-saving information are/is a common resource, the second user equipment executes at least one of inactivation or dormancy and stopping receiving the target item upon receiving the power-saving information transmitted from at least part of the user equipment within the target user equipment group and indicating inactivation or dormancy; or, in a case that the power-saving information transmitted from at least part of the user equipment within the target user equipment group and indicating inactivation or dormancy is received and the overlap of the inactivation or dormancy time corresponding to each piece of the received power-saving information is greater than a second threshold, at least one of inactivation or dormancy and stopping receiving the target item is executed.

Thus, the first user equipment UE1 is TX UE, the second user equipment UE2 is RX UE, and RX UE receives the power-saving information. Here, the power-saving information indicates the power-saving mechanism of UE2. Specifically, if the power-saving information indicates dormancy:

in a case that the resource of the power-saving information and/or the associated target resource thereof are/is a dedicated resource, TX UE stops transmitting the target item to RX UE, and RX UE executes at least one of dormancy and stopping receiving the target item transmitted by TX UE; in a case that the resource of the power-saving information and/or the associated target resource thereof are/is a common resource, TX UE stops transmitting the target item to RX UE, but only if at least part of UE in the target UE group has transmitted the power-saving information indicating dormancy, or in a case that the overlap of the dormancy time after transmitting the power-saving information is greater than a certain threshold (second threshold), RX UE executes at least one of dormancy and stopping receiving the target item transmitted by all the TX UE in the target UE group. Specifically, at least part of UE within the target UE group are TX UE that has transmitted the power-saving information about dormancy within a time window.

At least part of UE within the target UE group are all TX UE within the target UE group that has transmitted the power-saving information about dormancy. For example, if the target UE group includes 10 UE, but only 5 TX UE, all of which have transmitted the power-saving information about dormancy, UE2 executes at least one of dormancy and stopping receiving the target item transmitted by TX UE in the target UE group, in a case that the power-saving information about dormancy transmitted by the 5 TX UE is received; of course, if only 2 TX UE in the target UE group have transmitted the power-saving information about dormancy and not all TX UE has transmitted the power-saving information about dormancy, UE2 is not dormant and still receives the target item transmitted by the 5 TX UE within the target UE group in a case that the power-saving information about dormancy transmitted by the 2 TX UE is received.

Optionally, the first user equipment is a transmitting end of a target item and in a case that the power-saving information indicates activation or wake-up, the first user equipment transmits the target item;

the resource of the power-saving information and/or the target resource associated with the power-saving information are/is a resource dedicated to the user equipment, or, the resource of the power-saving information and/or the target resource associated with the power-saving information are/is a common resource.

Correspondingly, the second user equipment receiving the power-saving information is a receiving end of the target item:

in a case that the resource of the power-saving information and/or the target resource associated with the power-saving information are/is a dedicated resource the second user equipment executes at least one of activation or wake-up, and receiving the target item in a case that the power-saving information indicates activation or wake-up; in a case that the resource of the power-saving information and/or the target resource associated with the power-saving information are/is a common resource, the second user equipment executes at least one of activation or wake-up and receiving the target item upon receiving the power-saving information transmitted from any one or at least one of the user equipment within the target user equipment group and indicating activation or wake-up.

Specifically, if the power-saving information indicates activation:

in a case that the resource of the power-saving information and/or the associated target resource thereof are/is a dedicated resource, TX UE transmits the target item to RX UE, and RX UE executes at least one of activation and receiving the target item; in a case that the resource of the power-saving information and/or the associated target resource thereof are/is a common resource, TX UE transmits the target item to RX UE, RX UE executes at least one of activation and receiving the target item upon receiving the power-saving information transmitted from any one or at least one of the user equipment within the target UE group and indicating activation.

Optionally, the first user equipment is a receiving end of a target item and in a case that the power-saving information indicates inactivation or dormancy, the first user equipment stops receiving the target item;

the resource of the power-saving information and/or the target resource associated with the power-saving information are/is a dedicated resource, or the resource of the power-saving information and/or the target resource associated with the power-saving information are/is a common resource.

Correspondingly, the second user equipment receiving the power-saving information is a transmitting end of the target item:

in a case that the resource of the power-saving information and/or the target resource associated with the power-saving information are/is a dedicated resource, the second user equipment executes at least one of inactivation or dormancy, and stopping transmitting the target item in a case that the power-saving information indicates inactivation or dormancy. in a case that the resource of the power-saving information and/or the target resource associated with the power-saving information are/is a common resource, the second user equipment executes at least one of inactivation or dormancy and stopping transmitting the target item in a case that the power-saving information transmitted from at least part of the user equipment within the target user equipment group and indicating inactivation or dormancy is received; or in a case that the power-saving information transmitted from at least part of the user equipment within the target user equipment group and indicating inactivation or dormancy is received and the overlap of the inactivation or dormancy time corresponding to each piece of the received power-saving information is greater than a first threshold, at least one of inactivation or dormancy and stopping transmitting the target item is executed.

Thus, the first user equipment UE1 is RX UE, the second user equipment UE2 is TX UE, and RX UE receives the power-saving information. Specifically, if the power-saving information indicates dormancy:

in a case that the resource of the power-saving information and/or the associated target resource thereof are/is a dedicated resource, TX UE executes at least one of dormancy and stopping transmitting the target item to RX UE, and RX UE stops receiving the target item transmitted by TX UE; in a case that the resource of the power-saving information and/or the associated target resource thereof are/is a common resource, RX UE stops receiving the target item transmitted by TX UE, but only if at least part of UE in the target UE group has transmitted the power-saving information indicating dormancy, or in a case that the overlap of the dormancy time after transmitting the power-saving information is greater than a certain threshold (first threshold), TX UE executes at least one of dormancy and stopping transmitting the target item to all TX UE in the target UE group. Specifically, at least part of UE within the target UE group has transmitted the power-saving information about dormancy within a time window.

At least part of UE within the target UE group are all RX UE within the target UE group that has transmitted the power-saving information about dormancy. For example, if the target UE group includes 10 UE, but only 5 RX UE, all of which have transmitted the power-saving information about dormancy, UE2 executes at least one of dormancy and stopping the target item transmitted to the 5 RX UE in the target UE group, in a case that the power-saving information about dormancy transmitted by the 5 RX UE is received; of course, if only 2 RX UE in the 10 UE have transmitted the power-saving information about dormancy, UE2 is not dormant and still transmits the target item to the 5 RX UE within the target UE group in a case that the power-saving information about dormancy transmitted by the 2 RX UE is received.

Optionally, the first user equipment is a receiving end of a target item and in a case that the power-saving information indicates activation or wake-up, the first user equipment receives the target item;

the resource of the power-saving information and/or the target resource associated with the power-saving information are/is a dedicated resource, or the resource of the power-saving information and/or the target resource associated with the power-saving information are/is a common resource.

Correspondingly, the second user equipment receiving the power-saving information is a transmitting end of the target item:

in a case that the resource of the power-saving information and/or the target resource associated with the power-saving information are/is a dedicated resource the second user equipment executes at least one of activation or wake-up, and transmitting the target item in a case that the power-saving information indicates activation or wake-up. in a case that the resource of the power-saving information and/or the target resource associated with the power-saving information are/is a common resource, the second user equipment executes at least one of activation or wake-up and transmitting the target item in a case that the power-saving information transmitted from any one or at least one of the user equipment within the target user equipment group and indicating activation or wake-up is received.

Thus, the first user equipment UE1 is RX UE, the second user equipment UE2 is TX UE, and RX UE receives the power-saving information. Specifically, if the power-saving information indicates activation:

in a case that the resource of the power-saving information and/or the associated target resource thereof are/is a dedicated resource, RX UE receives the target item, and TX UE executes at least one of activation and transmitting the target item to RX UE; in a case that the resource of the power-saving information and/or the associated target resource thereof are/is a common resource, RX UE receives the target item transmitted by TX UE, but only if at least one UE in the target UE group has transmitted the power-saving information indicating activation, TX UE executes at least one of activation and transmitting the target item to all the TX UE in the target UE group.

the target UE group is a group, including TX UE and/or RX UE, to which at least one of UE1 and UE2 belongs, specifically, one possible implementation method is that the target UE group may be formed based on at least one of UE located at the predetermined geographic location 1, UE not located at the predetermined geographic location 2, UE located within the predetermined communication distance 1, UE not within the communication distance 2, etc. For example, UE all located within zone #0 may be seen as the target UE group, e.g. UE located within the communication distance thereof may be seen as the target UE group.

The target item in this embodiment may be at least one of data, control and RS. The dedicated resource may be understood as a resource available only to the receiving and transmitting end of the power-saving information, and the common resource may be understood as a resource available to both the receiving and transmitting end of the power saving information, and the user equipment other than the receiving and transmitting end of the power-saving information.

Figures 22, 23, 24:
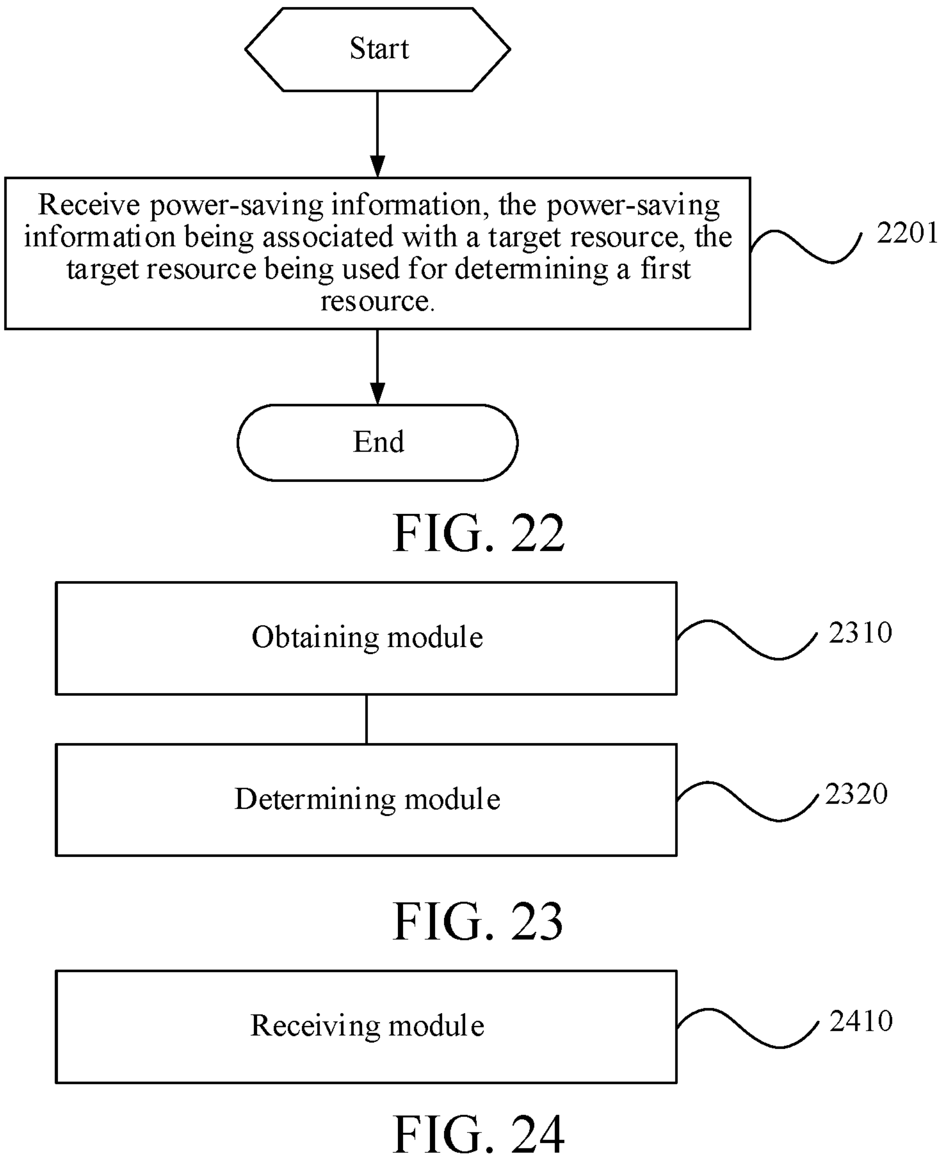
FIG. 22 is a schematic flowchart of a method for processing power saving according to an embodiment of this application.
FIG. 23 is a structural diagram of an apparatus corresponding to FIG. 2.
FIG. 24 is a structural diagram of an apparatus corresponding to FIG. 22.

As shown in FIG. 22, a method for processing power saving of an embodiment of this application is executed by second user equipment and includes:

Step 2201: Receive power-saving information, the power-saving information being associated with a target resource, the target resource being used for determining a first resource; the first resource including at least one of the following:

a resource of the power-saving information, a resource of target transmission, and an idle resource.

Here, the power-saving information is used for indicating that first target user equipment is active or woken up or inactive or dormant, the power-saving information has the target resource associated therewith, and the target resource is used for determining the first resource. Thus, by receiving the power-saving information, the user equipment at both ends of communication keep consistent understanding on resources, thereby achieving coordination and saving power.

In this embodiment, the power-saving information includes at least one of the following:

occupancy information; and a power-saving indication command.

Optionally, the second user equipment is a transmitting end of a target item, and executes, in a case that the power-saving information indicates inactivation or dormancy, and a resource of the power-saving information and/or the target resource associated with the power-saving information are/is a dedicated resource, at least one of the following:

inactivation or dormancy; and stopping transmitting the target item.

Optionally, the second user equipment is a transmitting end of a target item, and in a case that the power-saving information indicates inactivation or dormancy, and a resource of the power-saving information and/or the target resource associated with the power-saving information are/is a common resource, executes, in a case that the power-saving information transmitted from at least part of user equipment within a target user equipment group and indicating inactivation or dormancy is received, at least one of the following: inactivation or dormancy; and stopping transmitting the target item; or, executes, in a case that the power-saving information transmitted from at least part of user equipment within a target user equipment group and indicating inactivation or dormancy is received and the overlap of the inactivation or dormancy time corresponding to each piece of the received power-saving information is greater than a first threshold, at least one of the following: inactivation or dormancy; and stopping transmitting the target item.

Optionally, the second user equipment is a transmitting end of a target item, and executes, in a case that the power-saving information indicates activation or wake-up, and a resource of the power-saving information and/or the target resource associated with the power-saving information are/is a dedicated resource, at least one of the following: activation or wake-up; and transmitting the target item.

Optionally, the second user equipment is a transmitting end of a target item, and in a case that the power-saving information indicates activation or wake-up, and a resource of the power-saving information and/or the target resource associated with the power-saving information are/is a common resource, executes, in a case that the power-saving information transmitted from any one or at least one of user equipment within a target user equipment group and indicating activation or wake-up is received, at least one of the following: activation or wake-up; and transmitting the target item.

Optionally, the second user equipment is a receiving end of a target item, and executes, in a case that the power-saving information indicates inactivation or dormancy, and a resource of the power-saving information and/or the target resource associated with the power-saving information are/is a dedicated resource, at least one of the following: inactivation or dormancy; and stopping receiving the target item.

Optionally, the second user equipment is a receiving end of a target item, and in a case that the power-saving information indicates inactivation or dormancy, and a resource of the power-saving information and/or the target resource associated with the power-saving information are/is a common resource, executes, in a case that the power-saving information transmitted from at least part of user equipment within a target user equipment group and indicating inactivation or dormancy is received, at least one of the following: inactivation or dormancy; and stopping receiving the target item; or, executes, in a case that the power-saving information transmitted from at least part of user equipment within a target user equipment group and indicating inactivation or dormancy is received and the overlap of the inactivation or dormancy time corresponding to each piece of the received power-saving information is greater than a second threshold, at least one of the following: inactivation or dormancy; and stopping receiving the target item.

Optionally, the second user equipment is a receiving end of a target item, and executes, in a case that the power-saving information indicates activation or wake-up and a resource of the power-saving information and/or the target resource associated with the power-saving information are/is a dedicated resource, at least one of the following: activation or wake-up; and receiving the target item.

Optionally, the second user equipment is a receiving end of a target item, and in a case that the power-saving information indicates activation or wake-up and a resource of the power-saving information and/or the target resource associated with the power-saving information are/is a common resource, executes, in a case that the power-saving information transmitted from any one or at least one of user equipment within a target user equipment group and indicating activation or wake-up is received, at least one of the following: activation or wake-up; and receiving the target item.

It is to be noted that: the method is implemented in cooperation with the above-mentioned method for selecting a resource executed by the first user equipment, and the implementation mode of the above-mentioned method embodiment, being applicable to the method, also achieves the same technical effect.

It is to be noted that: in the method for selecting a resource provided by the embodiment of this application, the execution body may be an apparatus for selecting a resource, or a control module in the apparatus for selecting a resource for executing the loaded method for selecting a resource. The method for selecting a resource provided by the embodiment of this application is illustrated in the embodiment of this application with the apparatus for selecting a resource executing the loaded method for selecting a resource as an example.

As shown in FIG. 23, an apparatus for selecting a resource of an embodiment of this application includes:

- an obtaining module 2310, configured to obtain a target resource associated with power-saving information; and
- a determining module 2320, configured to determine a first resource in the target resource; the first resource including at least one of the following:
- a resource of the power-saving information,
- a resource of target transmission, and
- an idle resource.

Optionally, the determining module is further configured to:

- determine, in the target resource, a first resource indicated by the power-saving information.

Optionally, the determining module is further configured to:

- determine, in the target resource, a first resource corresponding to specific target
- parameters; the specific target parameter being one or more target parameters.

Optionally, a corresponding relationship exists between the target parameter and a second resource; the second resource including at least one of the following:

- a resource of the power-saving information,
- the first resource; and
- the target resource.

Optionally, the target parameter includes at least one of the following:

- an identifier of user equipment;
- communication-related location information;
- power-saving mechanism;
- process information;
- resource pool information;
- carrier information;
- bandwidth part information;
- an identifier of the power-saving information;
- information about the resource of the power-saving information; and
- information about the target resource.

Optionally, an identifier of the second resource is determined in at least one of the following ways:

determining according to the ordering number of at least a part of the second resource in time domain;

determining according to the ordering number of at least a part of the second resource in frequency domain; and determining according to the ordering number of at least a part of the second resource in code domain.

Optionally, in a case that the second resource is the resource of the power-saving information, the identifier of the second resource is an identifier of the resource of the power-saving information or the identifier of the power-saving information;

in a case that the second resource is the target resource, the identifier of the second resource is an identifier of the target resource.

Optionally, the corresponding relationship is a correspondence between the target parameter and the identifier of the second resource.

Optionally, the power-saving information and/or the target resource are/is carried on at least one of the following:

a physical sidelink control channel PSCCH;

a physical sidelink feedback channel PSFCH;

a physical sidelink shared channel PSSCH; and a sequence.

Optionally, a frequency-domain resource of the power-saving information and/or the target resource includes at least one of the following:

at least part of a frequency-domain resource in a target resource block; and at least part of a frequency-domain resource in a target subchannel.

Optionally, the target resource block includes at least one of the following:

a resource block having a first identifier in a resource pool or bandwidth part or carrier;

a resource block of a subchannel other than a subchannel occupied by first SCI in a resource occupied by PSSCH scheduled by the first sidelink control information SCI;

a resource block other than a resource block occupied by first SCI in a resource occupied by PSSCH scheduled by the first SCI;

a resource block other than the resource pool in a resource of the bandwidth part;

a resource block other than a resource corresponding to PSFCH or PSFCH bitmaps in the resource of the bandwidth part;

a resource block other than a resource occupied by all or part of subchannels in a resource of the resource pool; and a resource block other than the resource corresponding to PSFCH or PSFCH bitmaps in the resource of the resource pool.

Optionally, the target subchannel includes at least one of the following:

a subchannel other than a subchannel occupied by first SCI in a resource occupied by PSSCH scheduled by the first sidelink control information SCI;

a subchannel other than a subchannel occupied by first SCI in a resource occupied by PSSCH scheduled by the first SCI;

a subchannel other than a resource pool in a bandwidth part;

a subchannel other than a resource corresponding to PSFCH or PSFCH bitmaps in the bandwidth part;

a subchannel other than a resource occupied by all or part of subchannels in a resource pool;

a subchannel other than the resource corresponding to PSFCH or PSFCH bitmaps in the resource pool;

a subchannel in the resource pool, a frequency domain of which satisfies the first condition;

a subchannel having a second identifier;

a subchannel having a first number of resource blocks; and a subchannel including at least a subchannel where the power-saving information is located.

Optionally, a time-domain resource of the power-saving information and/or the target resource includes at least one of the following:

symbols other than at least part of symbols of a first channel or signal in the first symbol;

at least part of symbols in symbols used for automatic gain control AGC;

a first symbol in symbols used for sidelink transmission;

at least part of symbols in symbols of PSCCH; and at least part of symbols in symbols of SCI.

Optionally, the resource of the power-saving information and/or the target resource are different in at least one of the following:

a channel or signal carrying the information;

a frequency-domain resource;

a time-domain resource; and a code-domain resource.

Optionally, the power-saving indication includes occupancy information and/or a power-saving indication command.

Optionally, a resource of the occupancy information and a resource of the power-saving indication command are different in at least one of the following:

a channel or signal carrying the information;

a frequency-domain resource;

a time-domain resource; and a code-domain resource.

Optionally, a time-domain resource of the power-saving information satisfies at least one of the following conditions:

the number of repetitions on the time domain being not less than a second number;

having a third number of repetitions on the time domain;

occupying Y time-domain units, Y being equal to the number of time-domain units used for sidelink transmission.

Optionally, there is no multiplexing between the power-saving information and a second channel or signal.

Optionally, that there is no multiplexing between the power-saving information and a second channel or signal includes:

there is no frequency division multiplexing between the power-saving information and the second channel or signal; or, there is no overlap between the time-domain resource of the power-saving information and a time-domain resource of the second channel or signal;

the second channel or signal being a channel or signal other than the power-saving information.

Optionally, sequences carried on different target resources are different.

Optionally, the apparatus further includes:

an information obtaining module, configured to obtain information about the power-saving information and/or the target resource.

Optionally, the information about the power-saving information and/or the information about the target resource include/includes at least one of the following:

information about the frequency-domain resource;

information about the time-domain resource;

the period of the resource;

the number of the resource;

the priority of the resource; and the proportion in the resource pool or at a given time.

Optionally, the apparatus further includes:

a parameter obtaining module, configured to obtain transmission parameters; and a transmission module, configure to carry out transmission on the first resource according to the transmission parameter.

Optionally, the apparatus further includes:

a transmitting module, configured to transmit the power-saving information.

Optionally, the first user equipment is a transmitting end of a target item and in a case that the power-saving information indicates inactivation or dormancy, the first user equipment stops transmitting the target item;

the resource of the power-saving information and/or the target resource associated with the power-saving information are/is a dedicated resource, or the resource of the power-saving information and/or the target resource associated with the power-saving information are/is a common resource.

Optionally, the first user equipment is a transmitting end of a target item and in a case that the power-saving information indicates activation or wake-up, the first user equipment transmits the target item;

the resource of the power-saving information and/or the target resource associated with the power-saving information are/is a resource dedicated to the user equipment, or, the resource of the power-saving information and/or the target resource associated with the power-saving information are/is a common resource.

Optionally, the first user equipment is a receiving end of a target item and in a case that the power-saving information indicates inactivation or dormancy, the first user equipment stops receiving the target item;

the resource of the power-saving information and/or the target resource associated with the power-saving information are/is a dedicated resource, or the resource of the power-saving information and/or the target resource associated with the power-saving information are/is a common resource.

Optionally, the first user equipment is a receiving end of a target item and in a case that the power-saving information indicates activation or wake-up, the first user equipment receives the target item;

the resource of the power-saving information and/or the target resource associated with the power-saving information are/is a dedicated resource, or the resource of the power-saving information and/or the target resource associated with the power-saving information are/is a common resource.

The apparatus further determines, in the obtained target resource associated with the power-saving information, the applicable first resource, such that the user equipment at both ends of communication keep consistent understanding on resources, thereby achieving coordination and saving power.

The apparatus for selecting a resource in the embodiment of this application may be an apparatus, or a component, an integrated circuit or a chip in a terminal. The apparatus may be a mobile electronic device or a non-mobile electronic device. For example, the mobile electronic device may be a mobile phone, a tablet computer, a notebook computer, a palm computer, vehicle user equipment, a wearable device, UMPC, a netbook, or PDA, etc.; the non-mobile electronic device may be a server, a network attached storage (NAS), a personal computer (PC), a television (TV), a teller machine, or a self-service machine, which is not specifically limited in the embodiment of this application.

The apparatus for selecting a resource in the embodiment of this application may be an apparatus with an operating system. The operating system may be an Android operating system, may be an ios operating system, or may be another possible operating system, which is not specifically limited in the embodiment of this application.

The apparatus provided by the embodiment of this application can implement all processes implemented by the first user equipment in the method embodiment shown in FIG. 2 to FIG. 21, details of which are omitted here for brevity.

It is to be noted that: in the method for processing power saving provided by the embodiment of this application, the execution body may be an apparatus for processing power saving, or a control module in the apparatus for executing the loaded method for processing power saving. The method for processing power saving provided by the embodiment of this application is illustrated in the embodiment of this application with the apparatus for processing power saving executing the loaded method for processing power saving as an example.

As shown in FIG. 24, an apparatus for processing power saving of an embodiment of this application includes:

a receiving module 2410, configured to receive power-saving information, the power-saving information being associated with a target resource, the target resource being used for determining a first resource; the first resource including at least one of the following:

a resource of the power-saving information, a resource of target transmission, and an idle resource.

Optionally, the power-saving information includes at least one of the following:

occupancy information; and a power-saving indication command.

Optionally, the second user equipment is a transmitting end of a target item, and executes, in a case that the power-saving information indicates inactivation or dormancy, and a resource of the power-saving information and/or the target resource associated with the power-saving information are/is a dedicated resource, at least one of the following: inactivation or dormancy; and stopping transmitting the target item.

Optionally, the second user equipment is a transmitting end of a target item, and in a case that the power-saving information indicates inactivation or dormancy, and a resource of the power-saving information and/or the target resource associated with the power-saving information are/is a common resource, executes, in a case that the power-saving information transmitted from at least part of the user equipment within a target user equipment group and indicating inactivation or dormancy is received, at least one of the following: inactivation or dormancy; and stopping transmitting the target item; or, executes, in a case that the power-saving information transmitted from at least part of user equipment within a target user equipment group and indicating inactivation or dormancy is received and the overlap of the inactivation or dormancy time corresponding to each piece of the received power-saving information is greater than a first threshold, at least one of the following: inactivation or dormancy; and stopping transmitting the target item.

Optionally, the second user equipment is a transmitting end of a target item, and executes, in a case that the power-saving information indicates activation or wake-up, and a resource of the power-saving information and/or the target resource associated with the power-saving information are/is a dedicated resource, at least one of the following: activation or wake-up; and transmitting the target item.

Optionally, the second user equipment is a transmitting end of a target item, and in a case that the power-saving information indicates activation or wake-up, and a resource of the power-saving information and/or the target resource associated with the power-saving information are/is a common resource, executes, in a case that the power-saving information transmitted from any one or at least one of user equipment within a target user equipment group and indicating activation or wake-up is received, at least one of the following: activation or wake-up; and transmitting the target item.

Optionally, the second user equipment is a receiving end of a target item, and executes, in a case that the power-saving information indicates inactivation or dormancy, and a resource of the power-saving information and/or the target resource associated with the power-saving information are/is a dedicated resource, at least one of the following: inactivation or dormancy; and stopping receiving the target item.

Optionally, the second user equipment is a receiving end of a target item, and in a case that the power-saving information indicates inactivation or dormancy, and a resource of the power-saving information and/or the target resource associated with the power-saving information are/is a common resource, executes, in a case that the power-saving information transmitted from at least part of user equipment within a target user equipment group and indicating inactivation or dormancy is received, at least one of the following: inactivation or dormancy; and stopping receiving the target item; or, executes, in a case that the power-saving information transmitted from at least part of user equipment within a target user equipment group and indicating inactivation or dormancy is received and the overlap of the inactivation or dormancy time corresponding to each piece of the received power-saving information is greater than a second threshold, at least one of the following: inactivation or dormancy; and stopping receiving the target item.

Optionally, the second user equipment is a receiving end of a target item, and executes, in a case that the power-saving information indicates activation or wake-up and a resource of the power-saving information and/or the target resource associated with the power-saving information are/is a dedicated resource, at least one of the following: activation or wake-up; and receiving the target item.

Optionally, the second user equipment is a receiving end of a target item, and in a case that the power-saving information indicates activation or wake-up and the resource of the power-saving information and/or the target resource associated with the power-saving information are/is a common resource, executes, in a case that the power-saving information transmitted from any one or at least one of user equipment within a target user equipment group and indicating activation or wake-up is received, at least one of the following: activation or wake-up; and receiving the target item.

Here, the power-saving information is used for indicating that first target user equipment is active or woken up or inactive or dormant, the power-saving information has the target resource associated therewith, and the target resource is used for determining the first resource. Thus, by receiving the power-saving information, the user equipment at both ends of communication keep consistent understanding on resources, thereby achieving coordination and saving power.

The apparatus for processing power saving in the embodiment of this application may be an apparatus, or a component, an integrated circuit or a chip in a terminal. The apparatus may be a mobile electronic device or a non-mobile electronic device. For example, the mobile electronic device may be a mobile phone, a tablet computer, a notebook computer, a palm computer, vehicle user equipment, a wearable device, UMPC, a netbook, or PDA, etc.; the non-mobile electronic device may be a server, a network attached storage (NAS), a personal computer (PC), a television (TV), a teller machine, or a self-service machine, which is not specifically limited in the embodiment of this application.

The apparatus for processing power saving in the embodiment of this application may be an apparatus with an operating system. The operating system may be an Android operating system, may be an ios operating system, or may be another possible operating system, which is not specifically limited in the embodiment of this application.

The apparatus for processing power saving provided by the embodiment of this application can implement all processes implemented by the second user equipment in the method embodiment shown in FIG. 23, details of which are omitted here for brevity.

Figure 25:
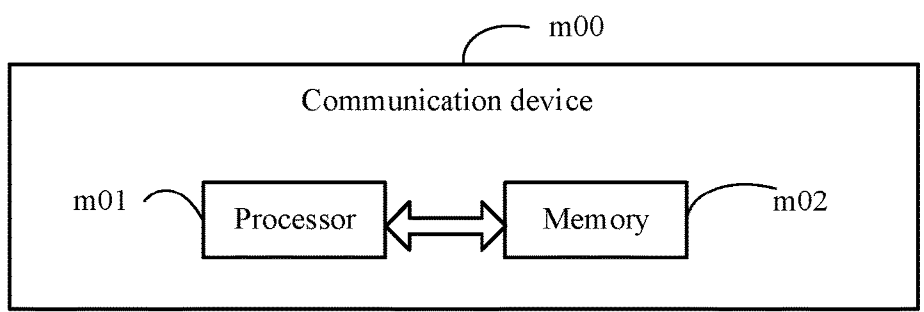
FIG. 25 is a structural diagram of a communication device according to an embodiment of this application.

Optionally, as shown in FIG. 25, an embodiment of this application further provides a communication device, including a processor 2501, a memory 2502, programs or instructions stored on the memory 2502 and executable on the processor 2501, where, for example, in a case that the communication device 2500 is a terminal, the program or instruction, in a case that executed by the processor 2501, implements the various processes of the method for selecting a resource described above, or, the method for processing power saving embodiment, and the same technical effect can be achieved. in a case that the communication device 2500 is a network side device, the program or instruction, in a case that executed by the processor 2501, implements the various processes of the method for selecting a resource described above, or, the method for processing power saving embodiment, and the same technical effect can be achieved, details of which are omitted here for brevity.

Figure 26:
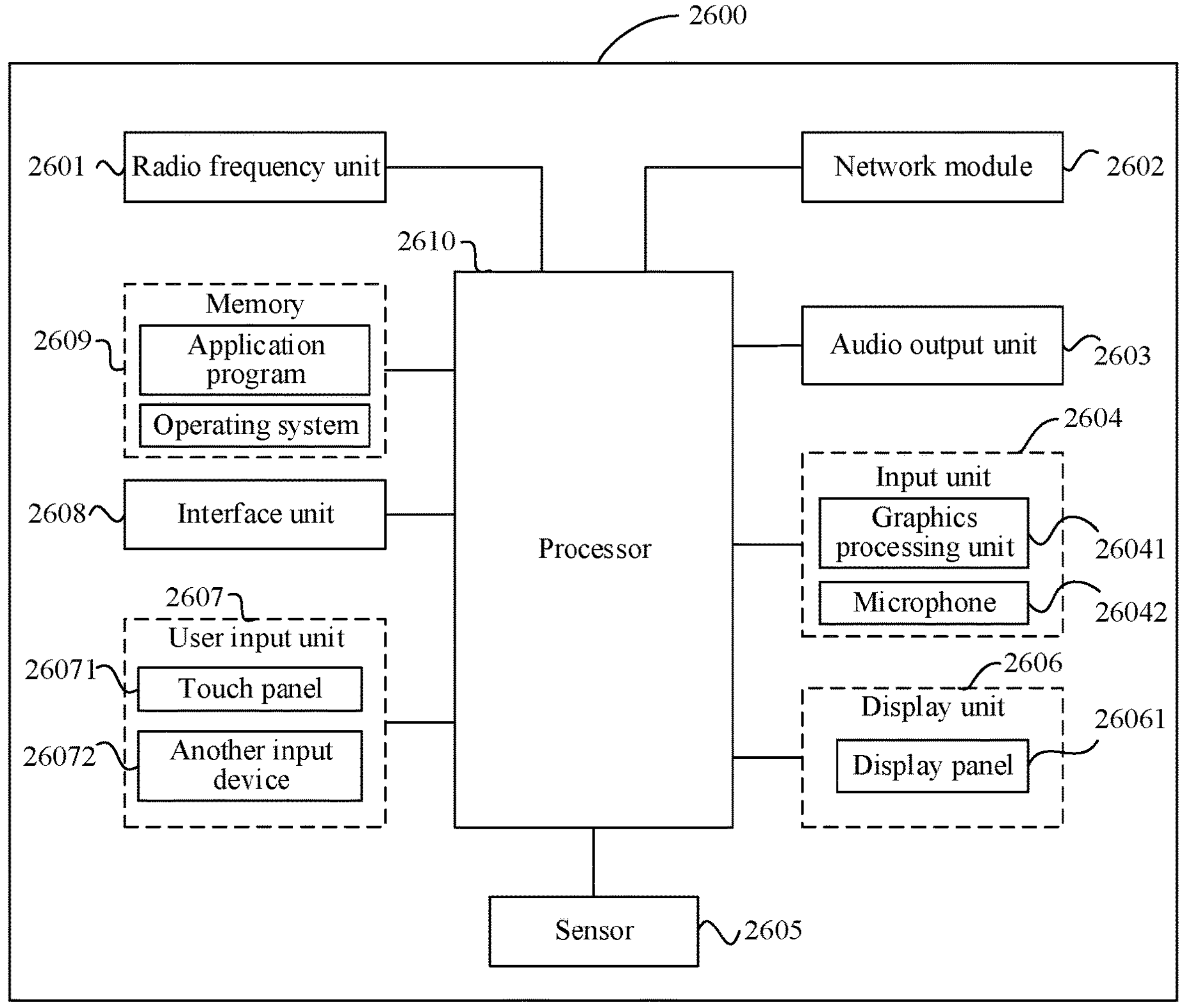
FIG. 26 is a structural diagram of user equipment according to an embodiment of this application.

FIG. 26 is a schematic diagram of a hardware structure of a terminal implementing various embodiments of this application.

The terminal 2600 includes, but is not limited to, components such as: a radio frequency unit 2601, a network module 2602, an audio output unit 2603, an input unit 2604, a sensor 2605, a display unit 2606, a user input unit 2607, an interface unit 2608, a memory 2609, and a processor 2610.

A person skilled in the art may understand that the terminal 2600 may further include a power supply (such as a battery) for supplying power to the various components, the power supply may be logically connected to the processor 2610 by a power management system, thereby implementing functions such as charging, discharging, and power consumption management by means of the power management system. The terminal structure shown in FIG. 26 does not constitute a limitation on the terminal, and the terminal may include components more or fewer than components shown in the figure, or combine some components, or have different component arrangements, which will not be described in detail here.

It is to be understood that, in the embodiment of this application, the input unit 2604 may include a graphics processing unit (GPU) 26041 and a microphone 26042. The graphics processing unit 26041 performs processing on image data of a static picture or a video that is obtained by an image acquisition device (for example, a camera) in a video acquisition mode or an image acquisition mode. The display unit 2606 may include a display panel 26061. The display panel 26061 may be configured in the form of a liquid crystal display (LCD), an organic light-emitting diode (OLED), or the like. The user input unit 2607 includes a touch panel 26071 and another input device 26072. The touch panel 26071 is also called a touchscreen. The touch panel 26071 may include two parts: a touch detection apparatus and a touch controller. The another input device 26072 may include, but not limited to, a physical keyboard, a functional key (such as a volume control key or a switch key), a track ball, a mouse, and a joystick, which will not be described in detail here.

In the embodiment of this application, after downlink data from the network side device is received by the radio frequency unit 2601, the downlink data is processed by the processor 2610. In addition, uplink data is transmitted to the network side device. Generally, the radio frequency unit 2601 includes, but is not limited to, an antenna, at least one amplifier, a transceiver, a coupler, a low noise amplifier, a duplexer, and the like.

The memory 2609 may be configured to store a software program or instruction and various data. The memory 2609 may mainly include a program and instruction storage area and a data storage area, where the program or instruction storage area may store an operating system, an application program or instruction required by at least one function (for example, a sound playback function and an image display function), and the like. In addition, the memory 2609 may include a high-speed random access memory, and may also include a non-volatile memory, where the non-volatile memory may be a read-only memory (ROM), a programmable read-only memory (PROM), an erasable programmable read-only memory (EPROM), an electrically erasable programmable read-only memory (EEPROM) or a flash memory, for example, at least one magnetic disk storage device, a flash memory or another non-volatile solid-state storage device.

The processor 2610 may include one or more processing units. Optionally, the processor 2610 may integrate an application processor and a modem processor, where the application processor mainly processes an operating system, a user interface, an application program or instruction, and the like, and the modem processor mainly processes wireless communication, such as a baseband processor. It can be understood that, the modem processor described above may not be integrated into the processor 2610.

The processor 2610 is configured to obtain a target resource associated with power-saving information; and determine a first resource in the target resource; the first resource including at least one of the following:

a resource of the power-saving information, a resource of target transmission, and an idle resource.

In the obtained target resource associated with the power-saving information, the applicable first resource is further determined, such that the user equipment at both ends of communication keep consistent understanding on resources, thereby achieving coordination and saving power.

Optionally, as another embodiment, user equipment executes the above method for processing power saving, and receives power-saving information, the power-saving information being associated with a target resource, the target resource being used for determining a first resource; the first resource including at least one of the following:

a resource of the power-saving information, a resource of target transmission, and an idle resource.

Here, the power-saving information is used for indicating that first target user equipment is active or woken up or inactive or dormant, the power-saving information has the target resource associated therewith, and the target resource is used for determining the first resource. Thus, by receiving the power-saving information, the user equipment at both ends of communication keep consistent understanding on resources, thereby achieving coordination and saving power.

An embodiment of this application further provide a readable storage medium, programs or instructions being stored on the readable storage medium, where the program or instruction, in a case that executed by a processor, implements the various processes of the method for selecting a resource described above, or, the method for processing power saving embodiment, and the same technical effect can be achieved, details of which are omitted here for brevity.

The processor is a processor in the electronic device in the embodiment described above. The readable storage medium includes a computer-readable storage medium, such as, a computer read-only memory (ROM), a random access memory (RAM), a magnetic disk, an optical disc or the like.

An embodiment of this application further provides a chip, the chip including a processor and a communication interface, the communication interface being coupled to the processor, where the processor is configured to run programs or instructions to implement the various processes of the method for selecting a resource described above, or, the method for processing power saving embodiment, and the same technical effect can be achieved, details of which are omitted here for brevity.

It should be understood that the chip mentioned in the embodiments of this application may also be referred to as a system-on-chip, a system on-chip, a chip system, etc.

An embodiment of this application provides computer program product, the computer program product being stored in a non-volatile storage medium, where the computer program product is executed by at least one processor to implement the various processes of the method for selecting a resource described above, or, the method for processing power saving embodiment, and the same technical effect can be achieved, details of which are omitted here for brevity.

It is to be noted that: the terms "include", "contain", or any other variants thereof in this specification are intended to cover a non-exclusive inclusion, such that a process, method, object, or apparatus including a set of elements includes not only those elements, but also other elements that are not expressly listed or elements that are inherent to such process, method, object, or apparatus. Without more limitations, elements defined by the sentence "including one" does not exclude that there are still other same elements in the processes, methods, objects, or apparatuses including the element. Furthermore, it is noted that the scope of the methods and apparatuses in the embodiments of this application is not limited to executing the functions in the order shown or discussed, but may also include executing the functions in a substantially simultaneous manner or in the reverse order according to the functions involved, for example, the described method may be executed in an order different from the order described, and various steps may also be added, omitted, or combined. In addition, features described with reference to some examples may also be combined in other examples.

According to the descriptions in the foregoing implementations, a person skilled in the art may clearly learn that the method according to the foregoing embodiment may be implemented by relying on software and an essential common hardware platform or, of course, by using hardware, however, in many cases the former is the better way to implement the method. Based on such an understanding, the technical solutions of this application essentially, or the part contributing to the prior art, may be presented in the form of a software product. The computer software product is stored in a storage medium (for example, ROM/RAM, a magnetic disk, or an optical disc) including several instructions to enable a terminal (which may be a mobile phone, a computer, a server, an air conditioner, a network device, or the like) to execute the methods described in the various embodiments of this application.

The embodiments of this application have been described above with reference to the accompanying drawings. The present disclosure is not limited to the specific embodiments described above, and the specific embodiments described above are merely exemplary and not restrictive. Those of ordinary skill in the art may make various variations under the teaching of this application without departing from the spirit of this application and the protection scope of the claims, and such variations all fall within the protection scope of this application.

What is claimed is:

1. A method for selecting a resource, executed by first user equipment, comprising:
obtaining a target resource associated with power-saving information; and
determining a first resource in the target resource; the first resource comprising at least one of the following:
a resource of the power-saving information,
a resource of target transmission, and
an idle resource;
wherein a time-domain resource of the power-saving information and/or the target resource comprises at least one of the following:
symbols other than at least part of symbols of a first channel or signal in the first symbol;
at least part of symbols in symbols used for automatic gain control AGC;
a first symbol in symbols used for sidelink transmission;
at least part of symbols in symbols of PSCCH; and
at least part of symbols in symbols of SCI;
transmitting the power-saving information, wherein the first user equipment is a transmitting end of a target item and in a case that the power-saving information indicates inactivation or dormancy, the first user equipment stops transmitting the target item or stops receiving the target item, and further wherein the resource of the power-saving information and/or the target resource associated with the power-saving information are/is a dedicated resource, or the resource of the power-saving information and/or the target resource associated with the power-saving information are/is a common resource.

2. The method according to claim 1, wherein the determining a first resource in the target resource comprises:
determining, in the target resource, a first resource corresponding to a specific target parameter; wherein the specific target parameter comprises one or more of target parameters;
wherein the target parameter comprises at least one of the following:
an identifier of user equipment;
communication-related location information;
power-saving mechanism;
process information;
resource pool information;
carrier information;
bandwidth part information;
an identifier of the power-saving information;
information about the resource of the power-saving information; and
information about the target resource.

3. The method according to claim 2, wherein a corresponding relationship exists between the target parameter and a second resource, the second resource comprising at least one of the following:
a resource of the power-saving information,
the first resource; and
the target resource.

4. The method according to claim 3, wherein an identifier of the second resource is determined in at least one of the following ways:
determining according to the ordering number of at least a part of the second resource in time domain;
determining according to the ordering number of at least a part of the second resource in frequency domain; and
determining according to the ordering number of at least a part of the second resource in code domain.

5. The method according to claim 1, wherein the power-saving information and/or the target resource are/is carried on at least one of the following:
a physical sidelink control channel PSCCH;
a physical sidelink feedback channel PSFCH;
a physical sidelink shared channel PSSCH; and
a sequence.

6. The method according to claim 1, wherein a frequency-domain resource of the power-saving information and/or the target resource comprises at least one of the following:
at least part of a frequency-domain resource in a target resource block; and
at least part of a frequency-domain resource in a target subchannel;
wherein the target resource block comprises at least one of the following:
a resource block having a first identifier in a resource pool or bandwidth part or carrier;
a resource block of a subchannel other than a subchannel occupied by first SCI in a resource occupied by PSSCH scheduled by the first sidelink control information SCI;
a resource block other than a resource block occupied by the first SCI in the resource occupied by PSSCH scheduled by the first SCI;
a resource block other than the resource pool in a resource of the bandwidth part;
a resource block other than a resource corresponding to PSFCH or PSFCH bitmaps in the resource of the bandwidth part;
a resource block other than a resource occupied by all or part of subchannels in a resource of the resource pool; and
a resource block other than the resource corresponding to PSFCH or PSFCH bitmaps in the resource of the resource pool;
wherein the target subchannel comprises at least one of the following:

a subchannel other than a subchannel occupied by first SCI in a resource occupied by PSSCH scheduled by the first sidelink control information SCI;

a subchannel other than a subchannel occupied by first SCI in a resource occupied by PSSCH scheduled by the first SCI;

a subchannel other than a resource pool in a bandwidth part;

a subchannel other than a resource corresponding to PSFCH or PSFCH bitmaps in the bandwidth part;

a subchannel other than a resource occupied by all or part of subchannels in a resource pool;

a subchannel other than the resource corresponding to PSFCH or PSFCH bitmaps in the resource pool;

a subchannel in the resource pool, a frequency domain of which satisfies a first condition;

a subchannel having a second identifier;

a subchannel having a first number of resource blocks; and a subchannel comprising at least a subchannel where the power-saving information is located.

7. The method according to claim 1, wherein a time-domain resource of the power-saving information satisfies at least one of the following conditions:

the number of repetitions on the time domain being not less than a second number;

having a third number of repetitions on the time domain; and occupying Y time-domain units, Y being equal to the number of time-domain units used for sidelink transmission.

8. The method according to claim 1, wherein there is no multiplexing between the power-saving information and a second channel or signal.

9. The method according to claim 1, further comprising:

obtaining information about the power-saving information and/or information about the target resource;

wherein the information about the power-saving information and/or the information about the target resource comprise/comprises at least one of the following:

information about the frequency-domain resource;

information about the time-domain resource;

the period of the resource;

the number of the resource;

the priority of the resource; and the proportion in the resource pool or at a given time.

10. The method according to claim 1, further comprising:

obtaining a transmission parameter; and performing transmission on the first resource according to the transmission parameter.

11. The method according to claim 1, wherein the first user equipment is a transmitting end of a target item and in a case that the power-saving information indicates activation or wake-up, the first user equipment transmits the target item or receives the target item; wherein the resource of the power-saving information and/or the target resource associated with the power-saving information are/is a resource dedicated to the user equipment, or, the resource of the power-saving information and/or the target resource associated with the power-saving information are/is a common resource.

12. A method for processing power saving, executed by second user equipment, comprising:

receiving power-saving information, the power-saving information being associated with a target resource, and the target resource being used for determining a first resource; the first resource comprising at least one of the following:

a resource of the power-saving information, a resource of target transmission, and an idle resource;

wherein a time-domain resource of the power-saving information and/or the target resource comprises at least one of the following:

symbols other than at least part of symbols of a first channel or signal in the first symbol;

at least part of symbols in symbols used for automatic gain control AGC;

a first symbol in symbols used for sidelink transmission;

at least part of symbols in symbols of PSCCH; and at least part of symbols in symbols of SCI;

wherein the second user equipment is a transmitting end of a target item, and in a case that the power-saving information indicates inactivation or dormancy, if the resource of the power-saving information and/or the target resource associated with the power-saving information are/is a dedicated resource, executes at least one of the following:

inactivation or dormancy;

stopping transmitting the target item; and stopping receiving the target item;

or, if the resource of the power-saving information and/or the target resource associated with the power-saving information are/is a common resource, executes, in a case that the power-saving information transmitted from at least part of user equipment within a target user equipment group and indicating inactivation or dormancy is received, at least one of the following: inactivation or dormancy; stopping transmitting the target item; and stopping receiving the target item; or, executes, in a case that the power-saving information transmitted from at least part of user equipment within a target user equipment group and indicating inactivation or dormancy is received and the overlap of the inactivation or dormancy time corresponding to each piece of the received power-saving information is greater than a first threshold, at least one of the following: inactivation or dormancy; stopping transmitting the target item; and stopping receiving the target item.

13. The method according to claim 12, wherein the second user equipment is a transmitting end of a target item, and in a case that the power-saving information indicates activation or wake-up, if the resource of the power-saving information and/or the target resource associated with the power-saving information are/is a dedicated resource, executes at least one of the following: activation or wake-up;

transmitting the target item; and receiving the target item;

or, if the resource of the power-saving information and/or the target resource associated with the power-saving information are/is a common resource, executes, in a case that the power-saving information transmitted from any one or at least one of user equipment within a target user equipment group and indicating activation or wake-up is received, at least one of the following: activation or wake-up;

transmitting the target item; and receiving the target item.

14. A communication device, comprising: a processor, a memory, and a program or instruction stored on the memory and executable on the processor, the program or instruction, when executed by the processor, implementing the following steps:

obtaining a target resource associated with power-saving information;

determining a first resource in the target resource; the first resource comprising at least one of the following:

a resource of the power-saving information, a resource of target transmission, and an idle resource; and transmitting the power-saving information, wherein the first user equipment is a transmitting end of a target item and in a case that the power-saving information indicates inactivation or dormancy, the first user equipment stops transmitting the target item or stops receiving the target item, and further wherein the resource of the power-saving information and/or the target resource associated with the power-saving information are/is a dedicated resource, or the resource of the power-saving information and/or the target resource associated with the power-saving information are/is a common resource or, receiving power-saving information, the power-saving information being associated with a target resource, and the target resource being used for determining a first resource; the first resource comprising at least one of the following:

a resource of the power-saving information, a resource of target transmission, and an idle resource;

wherein the second user equipment is a transmitting end of a target item, and in a case that the power-saving information indicates inactivation or dormancy, if the resource of the power-saving information and/or the target resource associated with the power-saving information are/is a dedicated resource, executes at least one of the following:

inactivation or dormancy;

stopping transmitting the target item; and stopping receiving the target item;

or, if the resource of the power-saving information and/or the target resource associated with the power-saving information are/is a common resource, executes, in a case that the power-saving information transmitted from at least part of user equipment within a target user equipment group and indicating inactivation or dormancy is received, at least one of the following: inactivation or dormancy; stopping transmitting the target item; and stopping receiving the target item; or, executes, in a case that the power-saving information transmitted from at least part of user equipment within a target user equipment group and indicating inactivation or dormancy is received and the overlap of the inactivation or dormancy time corresponding to each piece of the received power-saving information is greater than a first threshold, at least one of the following: inactivation or dormancy; stopping transmitting the target item; and stopping receiving the target item;

wherein a time-domain resource of the power-saving information and/or the target resource comprises at least one of the following:

symbols other than at least part of symbols of a first channel or signal in the first symbol;

at least part of symbols in symbols used for automatic gain control AGC;

a first symbol in symbols used for sidelink transmission;

at least part of symbols in symbols of PSCCH; and at least part of symbols in symbols of SCI.

15. The communication device according to claim 14, wherein the determining a first resource in the target resource comprises:

determining, in the target resource, a first resource corresponding to a specific target parameter; wherein the specific target parameter comprises one or more of target parameters;

wherein the target parameter comprises at least one of the following:

an identifier of user equipment;

communication-related location information;

power-saving mechanism;

process information;

resource pool information;

carrier information;

bandwidth part information;

an identifier of the power-saving information;

information about the resource of the power-saving information; and information about the target resource.

16. The communication device according to claim 15, wherein a corresponding relationship exists between the target parameter and a second resource, the second resource comprising at least one of the following:

a resource of the power-saving information, the first resource; and the target resource.

* * * * *